(12) United States Patent
Lin et al.

(10) Patent No.: US 11,227,576 B2
(45) Date of Patent: *Jan. 18, 2022

(54) CONTINUOUS DEGREE OF FREEDOM ACOUSTIC CORES

(71) Applicants: General Electric Company, Schenectady, NY (US); MRA Systems, LLC, Wilmington, DE (US)

(72) Inventors: Wendy Wenling Lin, Montgomery, OH (US); Michael Moses Martinez, Liberty Township, OH (US); Rudramuni Kariveerappa Majjigi, Cincinnati, OH (US); David Patrick Calder, Baltimore, MD (US); Aaron Goldsholl, Liberty Township, OH (US)

(73) Assignees: GENERAL ELECTRIC COMPANY, Schenectady, NY (US); MRA SYSTEMS, LLC, Wilmington, DE (US)

( * ) Notice: Subject to any disclaimer, the term of this patent is extended or adjusted under 35 U.S.C. 154(b) by 255 days.

This patent is subject to a terminal disclaimer.

(21) Appl. No.: 16/415,754

(22) Filed: May 17, 2019

(65) Prior Publication Data

US 2019/0272812 A1    Sep. 5, 2019

Related U.S. Application Data

(63) Continuation of application No. 15/421,935, filed on Feb. 1, 2017, now Pat. No. 10,332,501.

(51) Int. Cl.
*G10K 11/172* (2006.01)
*G10K 11/168* (2006.01)
(Continued)

(52) U.S. Cl.
CPC .............. *G10K 11/172* (2013.01); *B32B 3/12* (2013.01); *B32B 7/12* (2013.01); *G10K 11/168* (2013.01);
(Continued)

(58) Field of Classification Search
CPC ...... G10K 11/172; G10K 11/168; B32B 3/12; B32B 7/12; B32B 2305/022; B32B 2305/024; B32B 2307/102
(Continued)

(56) References Cited

U.S. PATENT DOCUMENTS 3,734,234 A    5/1973    Wirt
3,831,710 A    8/1974    Writ
(Continued)

FOREIGN PATENT DOCUMENTS

EP    0 839 101    1/2002
WO    2016/133501    8/2016

OTHER PUBLICATIONS

International Search Report and Written Opinion issued in connection with corresponding PCT Application No. PCT/US18/013974 dated May 21, 2018.
(Continued)

*Primary Examiner* — Forrest M Phillips
(74) *Attorney, Agent, or Firm* — Dority & Manning, P.A.

(57) ABSTRACT

An acoustic liner and a method of attenuating noise are provided. The acoustic liner includes a face sheet, a back sheet spaced from the face sheet, and a core layer extending between the face sheet and the back sheet. The core layer includes a plurality of resonant cells, each resonant cell including at least one cell wall coupled to the back sheet along a cell wall base edge. The at least one cell wall extends from the back sheet at an angle toward the face sheet. The at least one cell wall further coupled to the face sheet along
(Continued)

a cell wall top edge. The resonant cell is formed in a predetermined shape and contains a volume in a space defined by the at least one cell wall, the back sheet, and the face sheet. The cell wall base edge length is greater than the cell wall top edge length.

28 Claims, 19 Drawing Sheets

(51) Int. Cl.
*B32B 3/12* (2006.01)
*B32B 7/12* (2006.01)
(52) U.S. Cl.
CPC ... *B32B 2305/022* (2013.01); *B32B 2305/024* (2013.01); *B32B 2307/102* (2013.01)
(58) Field of Classification Search
USPC ........................................................ 181/288
See application file for complete search history.

(56) References Cited

U.S. PATENT DOCUMENTS

| | | | |
|---|---|---|---|
| 3,905,443 A | 9/1975 | Sieuzac | |
| 3,913,702 A | 10/1975 | Wirt | |
| 4,141,433 A | 2/1979 | Warnaka | |
| 4,243,117 A | 1/1981 | Warnaka | |
| 4,265,955 A | 5/1981 | Harp et al. | |
| 4,339,018 A | 7/1982 | Warnaka | |
| 5,445,861 A | 8/1995 | Newton et al. | |
| 5,690,035 A | 11/1997 | Hatayama | |
| 6,182,787 B1 | 2/2001 | Kraft et al. | |
| 6,200,664 B1 | 3/2001 | Figge | |
| 6,203,656 B1 | 3/2001 | Syed | |
| 6,206,136 B1 | 3/2001 | Swindlehurst et al. | |
| 6,209,679 B1 | 4/2001 | Hogeboom et al. | |
| 6,630,093 B1 | 10/2003 | Jones | |
| 6,871,725 B2 | 3/2005 | Johnson | |
| 6,913,570 B2 | 7/2005 | Kehrle | |
| 7,410,455 B2 | 8/2008 | Akishev et al. | |
| 7,866,377 B2 | 1/2011 | Slaughter | |
| 8,464,831 B2* | 6/2013 | Burak | F02K 1/827 |
| | | | 181/292 |
| 9,302,869 B2 | 4/2016 | Kendrick et al. | |
| 9,365,022 B2 | 6/2016 | Kendrick et al. | |
| 10,032,445 B1 | 7/2018 | Linch | |
| 10,332,501 B2* | 6/2019 | Lin | B32B 27/281 |
| 2010/0307867 A1* | 12/2010 | Ogawa | B32B 15/20 |
| | | | 181/288 |
| 2011/0244213 A1* | 10/2011 | Jones | B32B 5/32 |
| | | | 428/304.4 |
| 2012/0006028 A1 | 1/2012 | Lee et al. | |
| 2014/0133964 A1 | 5/2014 | Ayle | |
| 2014/0251481 A1 | 9/2014 | Kroll et al. | |
| 2014/0305529 A1 | 10/2014 | Kroll et al. | |
| 2014/0341744 A1* | 11/2014 | Cazuc | F01D 9/041 |
| | | | 416/223 A |
| 2015/0027629 A1* | 1/2015 | Butler | B29D 99/0021 |
| | | | 156/306.6 |
| 2015/0044413 A1 | 2/2015 | Vauchel et al. | |
| 2015/0064015 A1 | 3/2015 | Perez | |
| 2016/0010863 A1* | 1/2016 | Ott | B22F 10/20 |
| | | | 428/141 |
| 2016/0067938 A1* | 3/2016 | Goodrich | B31D 5/0013 |
| | | | 428/136 |
| 2016/0109130 A1* | 4/2016 | Stastny | B23K 26/342 |
| | | | 60/755 |
| 2017/0012638 A1 | 3/2017 | Hayes et al. | |

OTHER PUBLICATIONS

Jones, M.G. et al., "Evaluation of Parallel-Element, Variable-Impedance, Broadband Acoustic Liner Concepts", AIAA-2012-2194, Jun. 2012.

* cited by examiner

CONTINUOUS DEGREE OF FREEDOM ACOUSTIC CORES

CROSS-REFERENCE TO RELATED APPLICATIONS

This application is a Continuation of U.S. patent application Ser. No. 15/421,935 filed Feb. 1, 2017, currently pending, which is hereby incorporated by reference herein.

BACKGROUND

The field of the disclosure relates generally to turbofan engines and, more particularly, to acoustic liners for turbofan engine components.

Aircraft engine noise can be a significant problem in high population areas and noise-controlled environments. The noise is generally composed of contributions from various source mechanisms in the aircraft, with fan noise typically being a dominant component of the noise at take-off and landing. Fan noise propagates through the engine intake duct, and is then radiated to the outside environment. Acoustic liners are known to be applied on the internal walls of the nacelle to attenuate the fan noise propagating through the engine ducts. Typical acoustic liners for engines are either a single degree of freedom (SDOF) liner, or a two degree of freedom (2DOF) liner, sometimes referred to as a double degree of freedom (DDOF) liner.

SDOF liners are formed of a porous facing sheet backed by a single layer of cellular separator such as honeycomb cells, which itself is backed by a solid backing plate that is substantially impervious to higher frequency noise transmission. 2DOF liners, on the other hand, are formed of two cellular layers between the porous facing sheet and the solid backing plate, with the two cellular layers separated by a porous septum sheet. The acoustic performance of both SDOF and 2DOF liners is strongly dependent on the depth of the cells in each honeycomb layer, where the cell depth controls the internal volume of the cell that is available for acoustic resonance. The additional layer of the 2DOF liner allows noise suppression of at least one other main frequency than the SDOF liner. However, the additional layer of the 2DOF liner significantly increases the weight of and cost to produce the liner, including through additive manufacturing.

At least some known SDOF honeycomb acoustic liners attempt to achieve the multiple frequency advantages of the 2DOF liner in an SDOF construction by forming individual cells within the core layer to have variable depths from the perforate facing sheet, thereby creating different resonant cavity volumes within the same SDOF layer. However, this variable depth construction requires a thicker core layer to accommodate the depth of longer individual cells that correspond to larger cavity volumes. Additionally, because some of the variable depth cells have shorter lengths, there is left a significant amount of solid material between the bottom of the shorter cell and the backing plate, which also increases the overall weight of the core layer.

BRIEF DESCRIPTION

In one aspect, an acoustic liner includes a face sheet, a back sheet spaced from said face sheet, and a core layer. The core layer includes a plurality of adjacent cavities extending between said face sheet and said back sheet. A thickness of the core layer is defined by a distance between said face sheet and said back sheet. The core layer further includes a plurality of first resonant cells, each first resonant cell of said plurality of first resonant cells includes at least one first cell wall coupled to the back sheet along a first cell wall base edge. The at least one cell wall extends from the back sheet at a first angle toward the face sheet. The at least one first cell wall is further coupled to the face sheet along a first cell wall top edge. The first resonant cell is formed in a first predetermined shape and contains a first volume in a space defined by the at least one first cell wall, the back sheet, and the face sheet. The first cell wall base edge length is greater than the first cell wall top edge length.

In another aspect, an acoustic structure includes a core layer including an inner side and an outer side spaced opposite the inner side across a thickness defined therebetween. The acoustic structure further includes a plurality of first resonant cells occupying the thickness of the core layer. Each first resonant cell of the plurality of first resonant cells includes at least one first cell wall extending at a first angle from a first cell wall base edge along the outer side to a first cell wall top edge along the inner side. The first resonant cell is formed in a first predetermined shape. The first resonant cell contains a first volume in a space defined by the at least one cell wall, the inner side, and the outer side. A length of the first cell wall base edge is greater than a length of the first cell wall top edge.

In still another aspect, a method of attenuating noise from a source generating a sound wave stream includes receiving a sound wave stream including a plurality of frequency components at a first surface of a core layer of an acoustic structure, the core layer including a plurality of resonant cells occupying a thickness of the core layer and channeling the sound wave stream into the core layer. The method further includes reflecting the sound wave stream from a first surface of a first resonant cell of the plurality of resonant cells to a second surface of a second resonant cell of the plurality of resonant cells, at least partially canceling at least some of the plurality of frequency components based on the reflecting, and absorbing a portion of an energy content of the reflected sound wave stream at each reflection.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. Additionally, well-known elements, devices, components, methods, process steps and the like may not be set forth in detail in order to avoid obscuring the invention.

A system for attenuating turbine engine noise is described herein. Features of the discussion and claims may be applied to various classes of engines including, turbojets, turbofans, turboprops, turboshafts, ramjets, rocket jets, pulse-jets, turbines, gas turbines, steam turbines, commercial engines, corporate engines, military engines, marine engines, etc. As used herein "turbine engine" includes engines other than, and in addition to, aircraft engines.

Sizes and shapes of cells forming an acoustic line of the sound attenuating system are selected to attenuate a certain range of frequencies that interact with shapes and sizes of cells by extracting a maximum amount of sound energy from the sound wave at each interaction with the cells.

Figure 1:
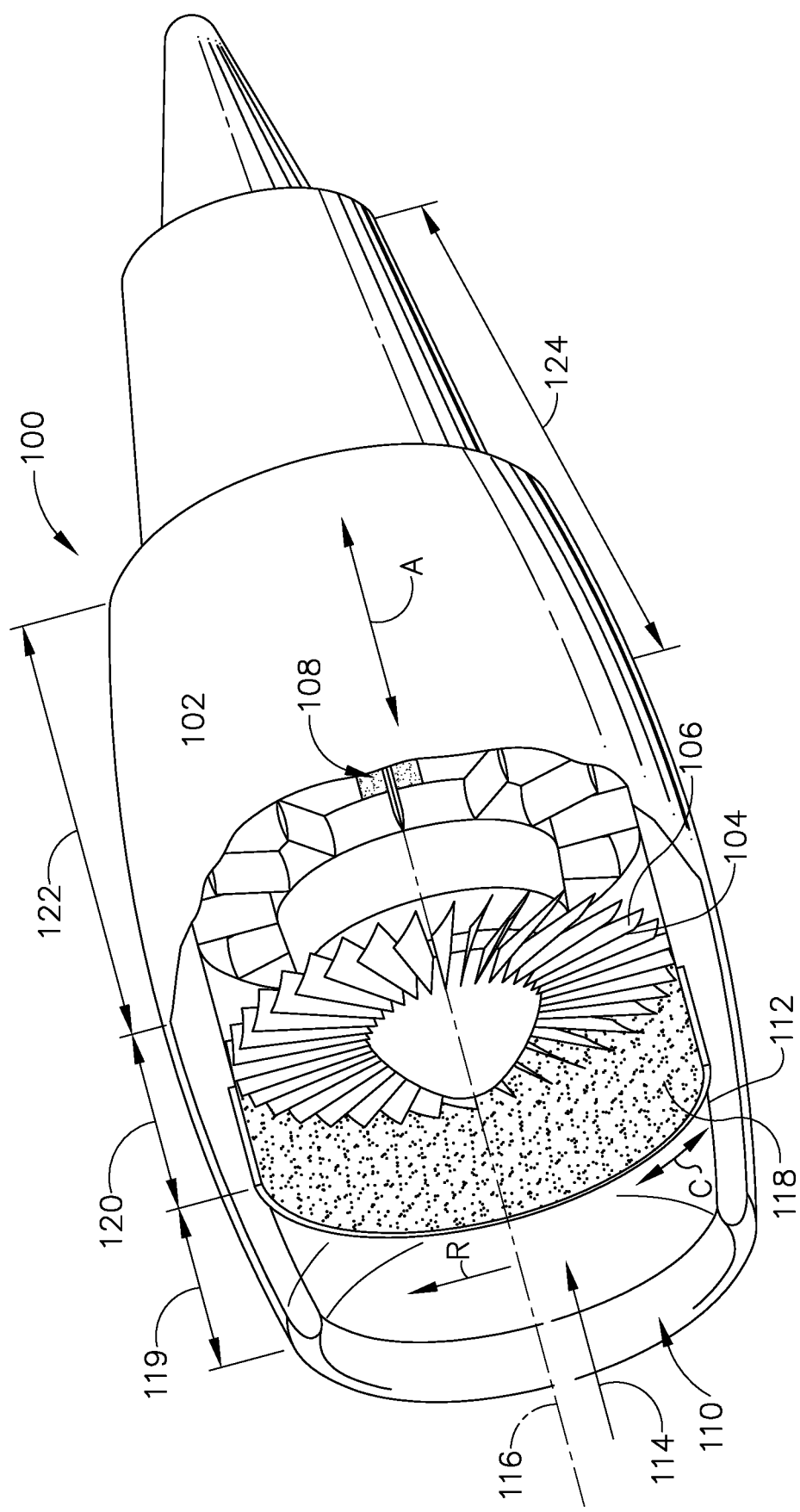
FIG. 1 is a perspective partial cutaway view of a turbofan engine.

Referring to the drawings wherein identical reference numerals denote the same elements throughout the various views, FIG. 1 shows a general orientation of a turbofan engine 100 in a perspective partial cutaway view, in accordance with an exemplary embodiment of the present disclosure. In the exemplary embodiment, turbofan engine 100 is embodied in a high-bypass turbofan jet engine for powering an aircraft (not shown) in flight. Turbofan engine 100 typically will be attached to the wings, fuselage, or tail (also not shown) of the aircraft through appropriate mountings.

Turbofan engine 100 includes a nacelle 102 surrounding a fan rotor 104, which includes a plurality of circumferentially spaced fan blades 106 powered by power turbine 108. Nacelle 102 defines a fan duct 110 having a duct inner wall 112 that receives an ambient inlet airflow 114 flowing downstream through fan rotor 104 along a longitudinal axial centerline 116. An acoustic liner 118 has an annular construction and is disposed along duct inner wall 112. In an exemplary embodiment, acoustic liner 118 is formed as an arcuate cylindrical acoustic liner 118 and is positioned along duct inner wall 112 upstream of fan blades 106 at an inner barrel 119 portion of nacelle 102. Additionally or alternatively, acoustic liner 118 is disposed along duct inner wall 112 radially outboard of fan blades 106 at a fan casing portion 120 of nacelle 102. In various embodiments, acoustic liner 118 is disposed along duct inner wall 112 downstream of fan blades 106 at a transcowl portion 122 of nacelle 102, and/or along non-rotating portions of fan casing portion 120 or other components, ducts, or casings within turbofan engine 100 where noise suppression (e.g., attenuation) is appropriate, such as, but not limited to core cowl portion 124, or which are capable of intercepting and suppressing noise having a predetermined range of frequencies.

As used herein, the terms "upstream" and "downstream" generally refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle.

In operation, fan rotor 104 rotates within fan casing portion 120, producing discrete tonal noise predominately at a blade passage frequency (BPF) and multiples thereof. During take-off of the aircraft, when fan blades 106 of fan rotor 104 reach transonic and supersonic rotational velocities during operation, noise is generated therefrom and propagated out of the fan duct 110 into the surrounding environment. In the exemplary embodiment, acoustic liner 118 serves to suppress noise resonating at the BPF and harmonics of the BPF. Acoustic liner 118 is configured to facilitate reducing the sound level of waves radiating from fan duct 110. In some embodiments, acoustic liner 118 is configured to absorb one or more components of the sound waves and thereby reducing the sound at specific frequencies. In other embodiments, acoustic liner 118 is able to reflect incident sound waves multiple times before the sound wave is able to escape acoustic liner 118. Multiple reflections serve to reduce the amplitude of the sound waves. Additionally, acoustic liner 118 can cause the sound waves to become out-of-phase, which tends to cancel at least some of the energy in the sound waves.

Figure 2:
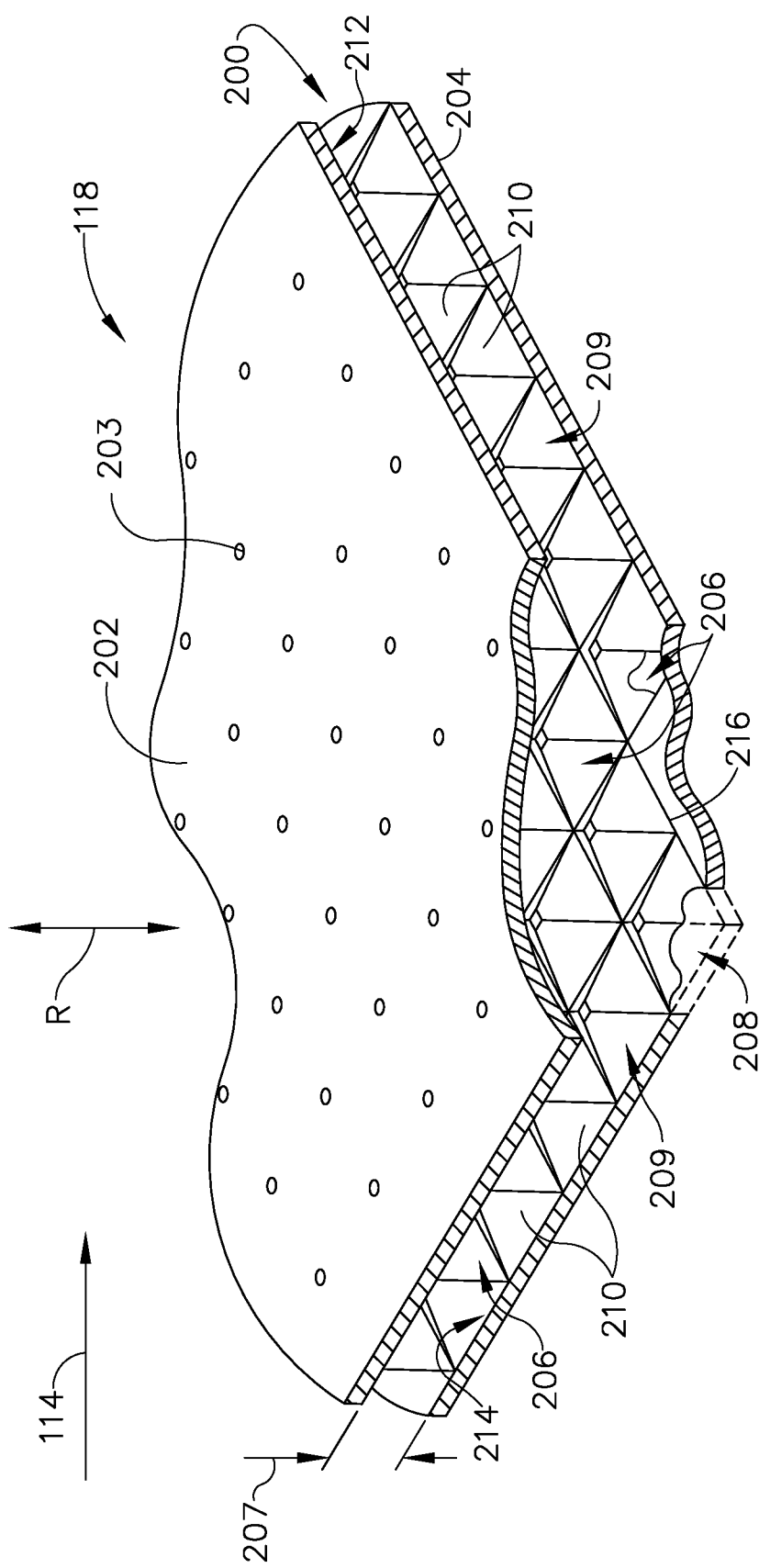
FIG. 2 is an isometric partial cutaway view of a portion of an acoustic liner that may be used with the turbofan engine depicted in FIG. 1.

FIG. 2 is an isometric partial cutaway view of a portion of acoustic liner 118 depicted in FIG. 1, disposed proximate airflow 114, in accordance with an exemplary embodiment. Acoustic liner 118 includes a core layer 200 topped by a face sheet 202. In the exemplary embodiment, face sheet 202 includes a plurality of perforations 203 extending through a material of construction of face sheet 202, and positioned and spaced therein in at least one of a regular repeating pattern and a random pattern. Core layer 200 is backed by a substantially imperforate back sheet 204 spaced from and opposing face sheet 202, and positioned generally axisymmetric face sheet 202. Referring to FIG. 1, back sheet 204, face sheet 202, and core layer 200 of acoustic liner 118 is formed as an arcuate cylindrical acoustic liner 118, as portion of which is depicted in FIG. 2. A noise source (e.g., fan blades 106 of fan rotor 104) is thus positioned within arcuate cylindrical acoustic liner 118 with face sheet 202 facing the noise source, and back sheet 204 more distal from noise source relative to face sheet 202. In an alternative embodiment, not shown, back sheet 204, face sheet 202, and core layer 200 of acoustic liner 118 is formed as a substantially flat acoustic liner 118. For example, and without limitation, a noise source is positioned in an enclosed volume such as a room containing noisy machinery, where the planar walls of the room are at least partially formed with substantially flat acoustic liner 118. In still other embodiments, not shown, back sheet 204, face sheet 202, and core layer 200 of acoustic liner 118 is formed as a complexly curved acoustic liner 118. For example, and without limitation, one or more complexly curved walls of a noise source-containing room are at least partially formed with complexly curved acoustic liner 118.

Core layer 200 includes a cellular structure formed of a plurality of adjacent cavities 206 that extend between face sheet 202 and back sheet 204. A thickness 207 of cavities 206 and core layer 200 is defined by a distance taken along a radial axis R (also shown in FIG. 1) between face sheet 202 and back sheet 204. In the exemplary embodiment, each cavity 206 of plurality of cavities 206 is defined by openings 208 between a plurality of first resonant cells 209 positioned adjacent one another. Each first resonant cell 209 of plurality of first resonant cells 209 includes at least one first cell wall 210 which defines a partition between adjacent cavities 206.

Face sheet 202 is attached to an inner side 212 of core layer 200 and back sheet 204 is attached to an outer side 214 of core layer 200. Outer side 214 defines a first curved surface and inner side 212 defines a second curved surface. In this exemplary embodiment, the terms "inner" and "outer" refer to the orientation of the respective layers in relation to longitudinal axial centerline 116, shown in FIG. 1. In the exemplary embodiment, acoustic liner 118 is formed unitarily using an additive manufacturing process. In one embodiment, back sheet 204 is formed in an additive manufacturing process, and plurality of first resonant cells 209 are formed thereupon by additive manufacturing. In some embodiments, additional cell walls are formed by an additive manufacturing process between adjacent first resonant cells 209 as shown and described in detail below.

Further, in the exemplary embodiment, face sheet 202, including perforations 203 thereof, is formed upon completing forming first resonant cells 209 by additive manufacturing. As used herein, "additive manufacturing" refers to any process which results in a three-dimensional (3D) object and includes a step of sequentially forming the shape of the object one layer at a time. Additive manufacturing processes include, for example, 3D printing, laser-net-shape manufacturing, direct laser sintering, direct laser melting, selective laser sintering (SLS), plasma transferred arc, freeform fabrication, stereolithography (SLA), and the like. Additive manufacturing processes can employ liquid materials, solid materials, powder materials, or wire as a raw material. Moreover, additive manufacturing processes can generally relate to a rapid way to manufacture an object (article, component, part, product, etc.) where a plurality of thin unit layers are sequentially formed to produce the object. For example, layers of a liquid material may be provided (e.g., laid down) and irradiated with an energy beam (e.g., laser beam) so that each layer are sequentially cured to solidify the layer.

In various embodiments, core layer 200 is formed using other processes, such as, but not limited to, casting or injection molding or electroforming, or coldspray.

In an alternative embodiment, face sheet 202 and back sheet 204 can be attached to core layer 200 by adhesive bonding, for example, by thermal, sonic, and or electric welding processes. Acoustic liner 118 is secured within turbofan engine 100 by attachment with duct inner wall 112 (shown in FIG. 1). In various embodiments, acoustic liner 118 is attached to engine 100 (shown in FIG. 1) via a flange joining it to the fan casing portion 120. Further, in an alternative embodiment, face sheet 202 is formed of a porous material, such as a wire mesh, a perforated sheet, or a woven or nonwoven fibrous material. In some embodiments, core layer 200 is molded, or fabricated by an additive or accumulative manufacturing process, such as 3-D printing, as described above. The ability of acoustic liner 118 to attenuate noise at a desired frequency, or range of frequencies, is dependent on its acoustic impedance, which is a function of a number of parameters, including thickness 207 of core layer 200 and shapes of cavities 206 and first resonant cells 209, as well as resident volumes contained therein, and an angle at which a first cell wall base edge 216 of first cell wall 210 extends from back sheet 204 to face sheet 202. Face sheet 202, back sheet 204, and core layer 200 of acoustic liner 118 may be formed of various materials that also may have an effect on the acoustic impedance of acoustic liner 118. For example, face sheet 202, back sheet 204, and/or core layer 200 may be formed of thermoplastic materials, such as, but not limited to, polyamide-imides (PAD, acrylonitrile butadiene styrene (ABS), polyetherimide (PEI), polyether ether ketone (PEEK). Additionally, face sheet 202, back sheet 204, and/or core layer 200 may be formed of thermoset materials, such as, but not limited to, epoxy, acrylic, vinylester, polyurethane, silicone, polyimide, cyanate ester, polyester. Further face sheet 202, back sheet 204, and/or core layer 200 may be formed of metals such as, but not limited to, aluminum, nickel, titanium, steel, cobalt chrome, nickel cobalt, and or a nickel-iron alloy having a low coefficient of thermal expansion (CTE).

Figure 3:
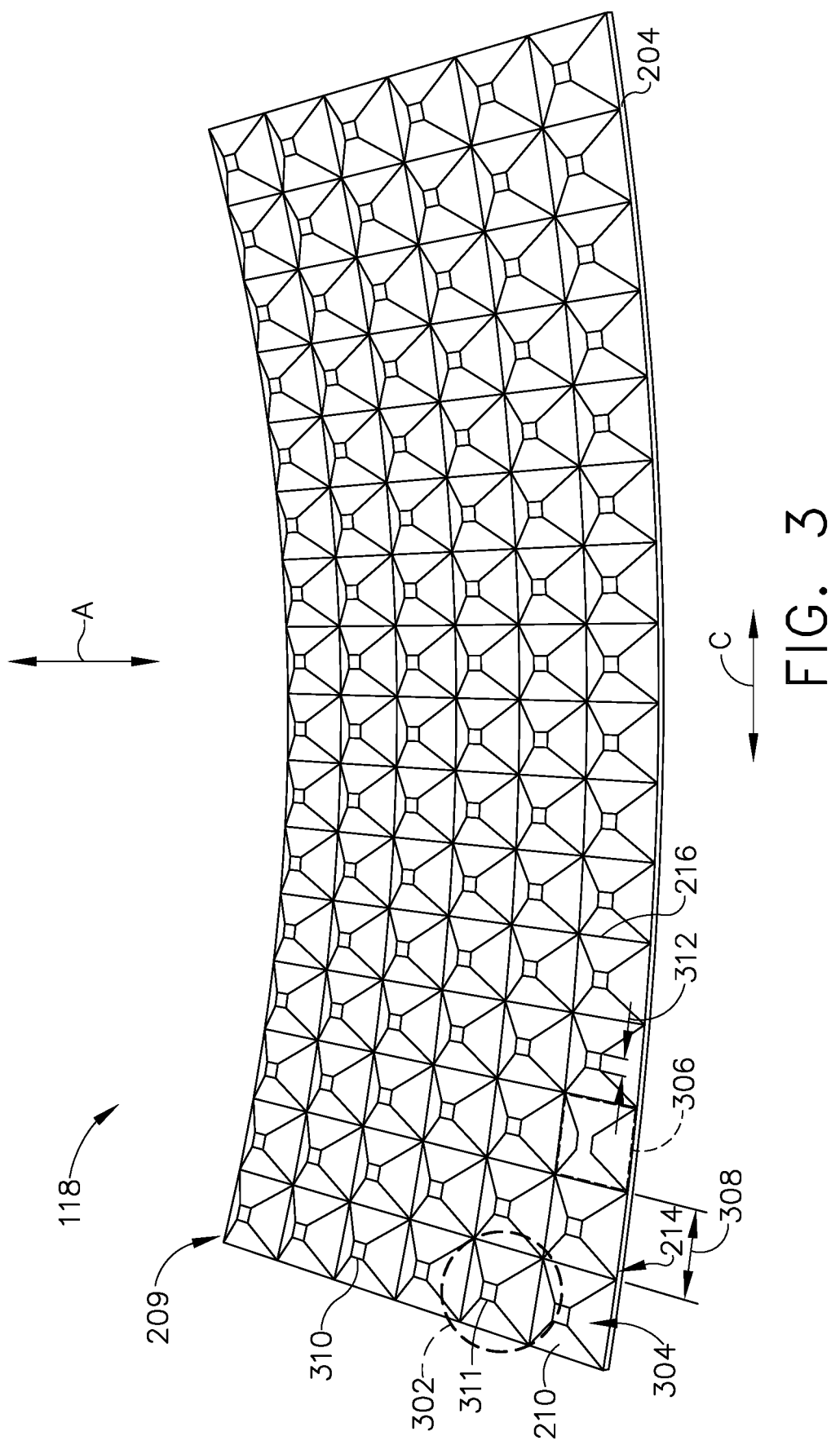
FIG. 3 is a perspective view of the cellular structure of a core layer of the acoustic liner shown in FIGS. 1 and 2.

FIG. 3 is a perspective view of the cellular structure of core layer 200 of acoustic liner 118, as shown in FIGS. 1 and 2. For illustrative purposes face sheet 202 is removed from the view illustrated in FIG. 3. As illustrated in FIG. 3, plurality of first resonant cells 209 are positioned on back sheet 204 in a grid arrangement, where outer side 214 of core layer 200 forms a rectangular grid by a tessellation of regular rectangular openings 208 (shown in FIG. 2) that generally align in a curved surface where outer side 214 fixedly joins back sheet 204. Each first resonant cell 209 of plurality of first resonant cells 209 coupled to back sheet 204 has an equivalent first shape. In the exemplary embodiment, first resonant cell 209 is embodied in a first shape defining a regular, right, truncated pyramid 302 with four faces 304 having approximately equal areas. Truncated pyramid 302 includes a first polygonal base 306 embodied in a square with four sides (e.g., n=4), each of which defines first cell wall base edge 216 with first length 308 along which a respective first cell wall 210 of first resonant cell 209 is coupled to back sheet 204. In the exemplary embodiment, a sum of first lengths 308 of respective first cell walls 210 defines a first perimeter along which first resonant cell 209 is coupled to back sheet 204.

Also, in the exemplary embodiment, truncated pyramid 302 includes a substantially planar frustum 310 that is substantially axisymmetric to first polygonal base 306. Frustum 310 is embodied in a square with four sides, each of which defines a first cell wall top edge 311 with a second length 312 along which respective first cell wall 210 of first resonant cell 209 is coupled to face sheet 202 (not shown). In the exemplary embodiment, a sum of second lengths 312 of respective first cell walls 210 defines a second perimeter along which first resonant cell 209 is coupled to face sheet 202. Furthermore, first shape of truncated pyramid 302-type first resonant cell 209 contains a first volume in a space therein defined by first cell walls 210 thereof, back sheet 204, and face sheet 202.

Figure 4:
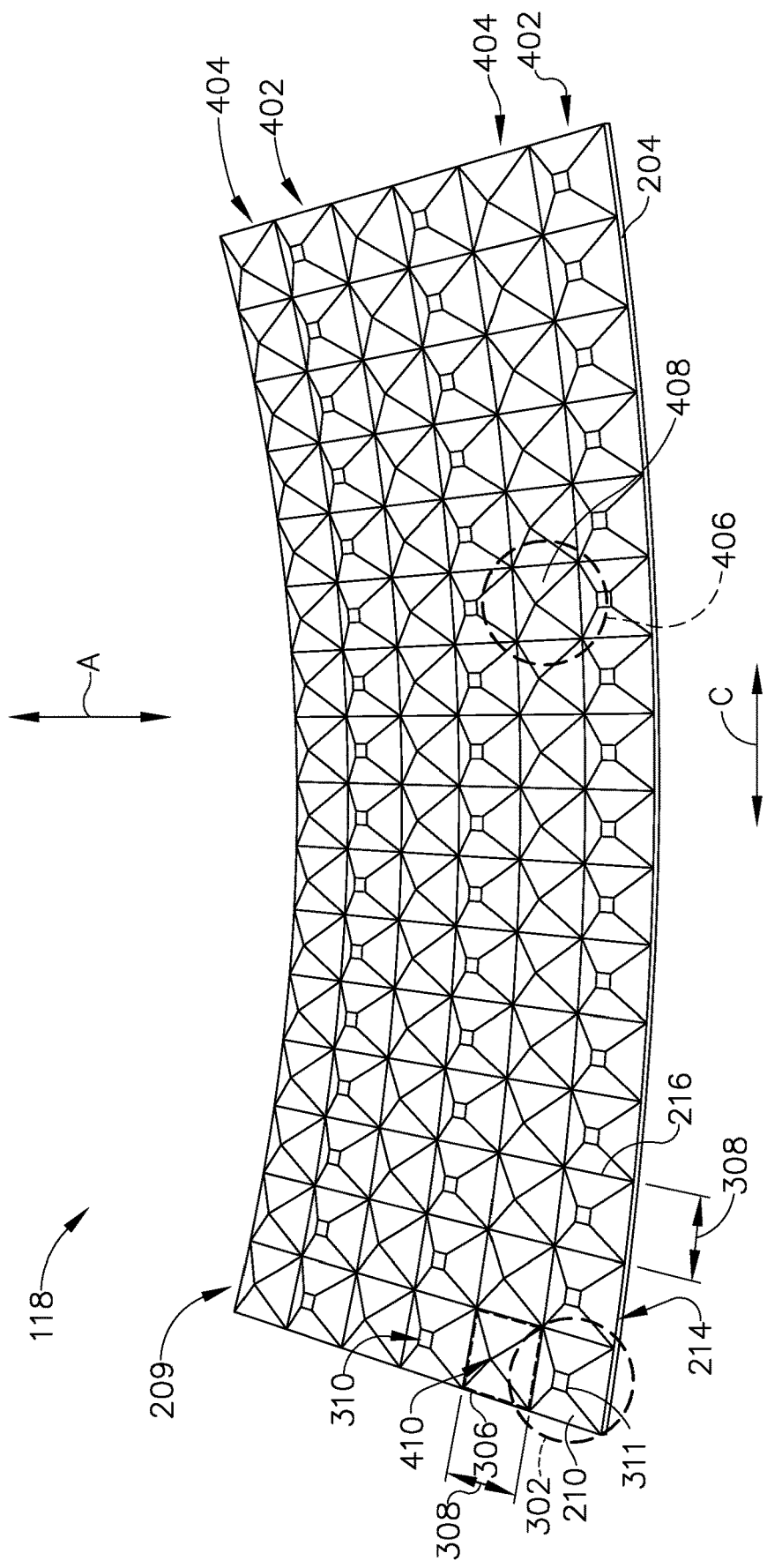
FIG. 4 is a perspective view of the cellular structure of an alternative embodiment of the core layer shown in FIGS. 2 and 3.

FIG. 4 is a perspective view of the cellular structure of an alternative embodiment of core layer 200 of acoustic liner 118. For illustrative purposes face sheet 202 is removed from the view illustrated in FIG. 4. As illustrated in FIG. 4, plurality of first resonant cells 209 are positioned on back sheet 204 in a grid arrangement, where outer side 214 of core layer 200 forms a rectangular grid by a tessellation of regular rectangular openings 208 (shown in FIG. 2) that generally align in a curved surface where outer side 214 fixedly joins back sheet 204. In the alternative embodiment, respective shapes of first resonant cells 209 alternate in an axial direction (A). Each first row 402 of a plurality of first rows 402 includes a plurality of first resonant cells 209 embodied in first shape defining regular, right, truncated pyramid 302, as shown and described above with reference to FIG. 3. Each second row 404 of a plurality of second rows 404 includes a plurality of first resonant cells 209 embodied in first shape defining a regular, right, non-truncated pyramid 406. First row 402 and second row 404 thus alternate in the axial direction (A). Non-truncated pyramid 406 has first polygonal base 306 with four sides, each of which defines first length 308, a sum of which defines first perimeter along which respective first cell walls 408 of non-truncated pyramid 406-type first resonant cell 209 are coupled to back sheet 204. In the alternative embodiment, first perimeters of non-truncated pyramid 406-type first resonant cells 209 are approximately equal to first perimeters of truncated pyramid 302-type first resonant cells. In other embodiments, not shown, non-truncated pyramid 406-type first resonant cells 209 have first perimeters that are different from first perimeters of truncated pyramid 302-type first resonant cells.

Also, in the alternative embodiment, non-truncated pyramid 406 does not include substantially planar frustum 310, but rather includes an apex 410 defining second length 312 (shown in FIG. 3) that is approximately equal to 0 (zero). Apex 410 thus defines a point at which respective first cell walls 408 are coupled to face sheet 202. Further, in the alternative embodiment, apex 410 defines inner side 212 of core layer 200, and a distance from back sheet 204 to apex 410 defines thickness 207. Similarly, frustum 310 also defines inner side 212, and a distance from back sheet 204 to frustum 310 also defines thickness 207. The first volume is defined by back sheet 204, face sheet 202, and first cell walls 408 of non-truncated pyramid 406-shaped first resonant cell 209.

Figure 5:
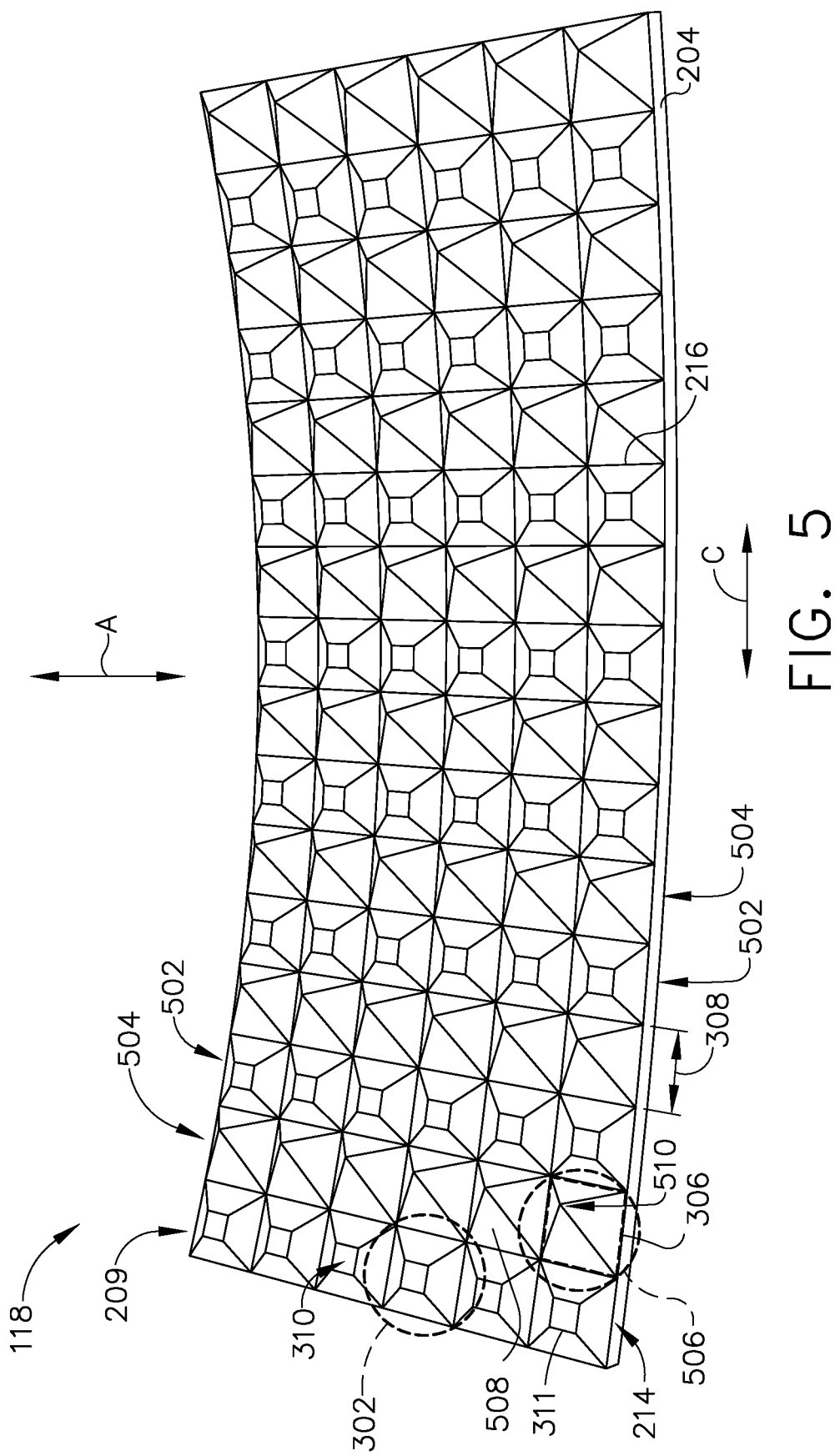
FIG. 5 is a perspective view of the cellular structure of another alternative embodiment of the core layer shown in FIGS. 2 and 3.

FIG. 5 is a perspective view of the cellular structure of another alternative embodiment of core layer 200 of acoustic liner 118. For illustrative purposes face sheet 202 is removed from the view illustrated in FIG. 5. As illustrated in FIG. 5, plurality of first resonant cells 209 are positioned on back sheet 204 in a grid arrangement, where outer side 214 of core layer 200 forms a rectangular grid by a tessellation of regular rectangular openings 208 (shown in FIG. 2) that generally align in a curved surface where outer side 214 fixedly joins back sheet 204. In this alternative embodiment, respective shapes of first resonant cells 209 alternate in a circumferential direction (C). Each first column 502 of a plurality of first columns 502 includes a plurality of first resonant cells 209 embodied in first shape defining regular, right, truncated pyramid 302, as shown and described above with reference to FIG. 3. Each second column 504 of a plurality of second columns 504 includes a plurality of first resonant cells 209 embodied in first shape defining a regular, oblique non-truncated pyramid 506. First column 502 and second column 504 thus alternate in the circumferential direction (C). Oblique non-truncated pyramid 506 has first polygonal base 306 with four sides, each of which defines first length 308, a sum of which defines first perimeter along which respective first cell walls 508 of oblique non-truncated pyramid 506-type first resonant cell 209 are coupled to back sheet 204. In this alternative embodiment, first perimeters of oblique non-truncated pyramid 506-type first resonant cells 209 are approximately equal to first perimeters of truncated pyramid 302-type first resonant cells. In other embodiments, not shown, oblique non-truncated pyramid 506-type first resonant cells 209 have first perimeters that are different from first perimeters of truncated pyramid 302-type first resonant cells.

Also, in this alternative embodiment, oblique non-truncated pyramid 506 does not include substantially planar frustum 310, but rather includes an apex 510 defining second length 312 (shown in FIG. 3) that is approximately equal to 0 (zero). Apex 510 thus defines a point at which respective first cell walls 508 are coupled to face sheet 202, thus further defining inner side 212 of core layer 200, where a distance from back sheet 204 to apex 510 defines thickness 207. Likewise, frustum 310 also defines inner side 212, and a distance from back sheet 204 to frustum 310 also defines thickness 207. The first volume is defined by back sheet 204, face sheet 202, and first cell walls 508 of oblique non-truncated pyramid 506-shaped first resonant cell 209.

Figure 6:
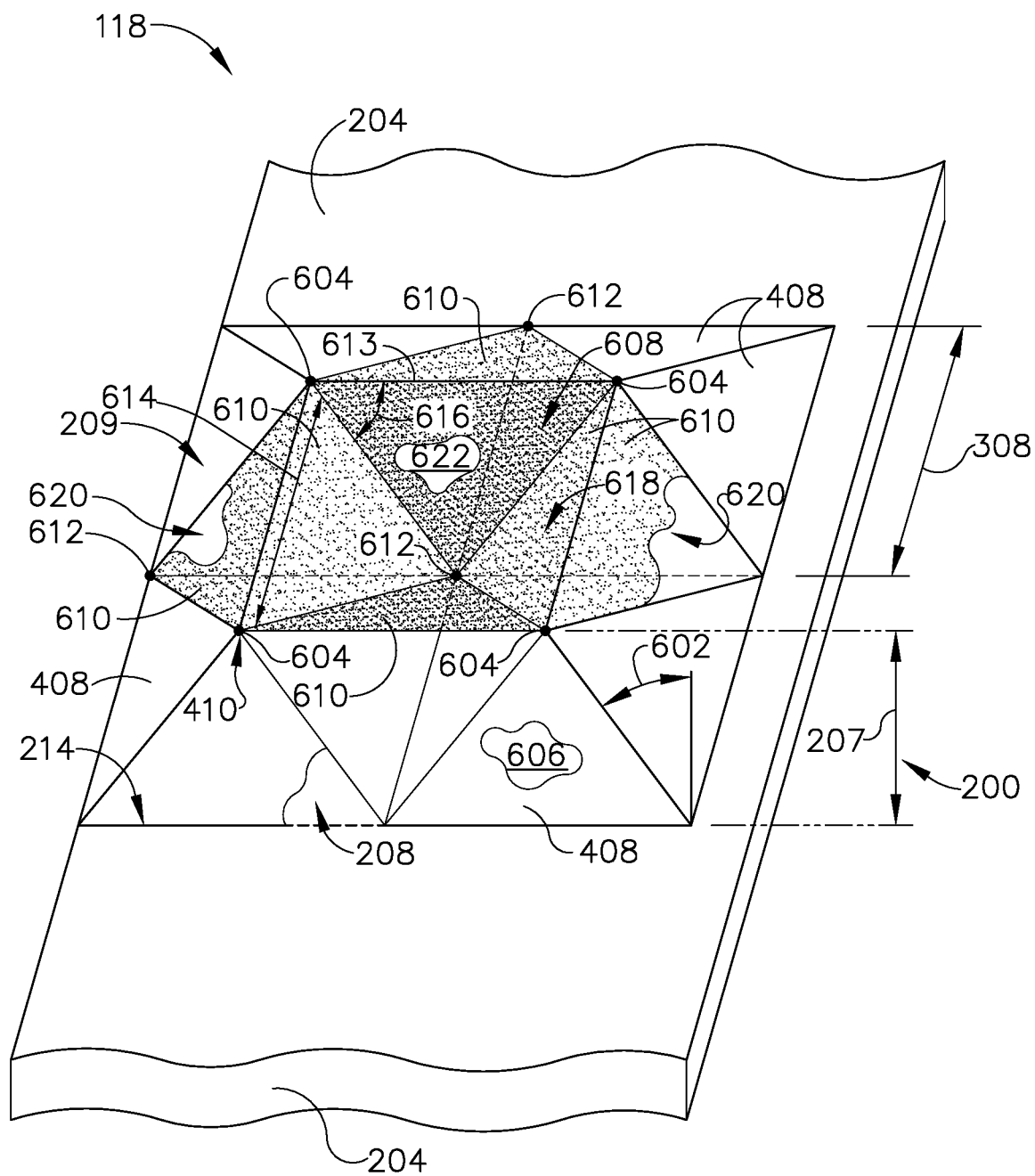
FIG. 6 is a perspective view of the cellular structure of yet another alternative embodiment of the core layer shown in FIGS. 2 and 3 depicted in a non-annular version.

FIG. 6 is a perspective view of the cellular structure of yet another alternative embodiment of core layer 200 of acoustic liner 118, but depicted in a non-annular version. For illustrative purposes face sheet 202 is removed from the view illustrated in FIG. 6. As illustrated in FIG. 6, plurality of first resonant cells 209 are positioned on back sheet 204 in a grid arrangement, where outer side 214 of core layer 200 forms a rectangular grid by a tessellation of regular rectangular openings 208 (shown in FIG. 2) that generally align in a plane where outer side 214 fixedly joins back sheet 204. Each first resonant cell 209 of plurality of first resonant cells 209 coupled to back sheet 204 has an equivalent first shape embodied in non-truncated pyramid 406. First cell walls 408 extend from back sheet 204 to face sheet 202 at a first angle 602. First cell walls 408 of non-truncated pyramid 406 couple to face sheet 202 at a first point 604 defined by apex 410 and having second length 312 (shown in FIG. 3) approximately equal to 0, as shown and described above with reference to FIG. 4. A space defined by first cell walls 408 of respective non-truncated pyramid 406-type first resonant cells 209, back sheet 204, and face sheet 202 contains a first volume 606 therein.

In this alternative embodiment, core layer 200 of acoustic liner 118 includes a plurality of second resonant cells 608 having four second cell walls 610. Second cell wall 610 is formed as a triangular planar sheet spanning first points 604 of two adjacent non-truncated pyramid 406-type first resonant cells 209 and a second point 612 defined where four adjacent non-truncated pyramid 406-type first resonant cells 209 meet on back sheet 204. Second cell wall 610 is coupled to face sheet 202 along a second cell wall base edge 613 with a third length 614. A sum of third lengths 614 of respective second cell walls 610 defines a third perimeter along which second resonant cell 608 is coupled to face sheet 202.

Second cell wall 610 also extends from each of the two respective first points 604 on face sheet 202 at a second angle 616 to second point 612 on back sheet 204. In this alternative embodiment, second angle 616 is approximately equal to first angle 602. Also, in this alternative embodiment, second cell wall 610 is coupled to back sheet 204 at second point 612, where second point 612 defines a fourth length less than third length 614 and approximately equal to 0. Thus, in this alternative embodiment, second resonant cell 608 defines a polyhedral second shape having approximately equivalent dimensions as non-truncated pyramid 406-type first resonant cells 209 (e.g., second point 612 defining an apex of second shape and third length 614 approximately equal to first length 308, as shown and described above with reference to FIG. 4), but where second shape has an opposite orientation relative to first shape with respect to face sheet 202 and back sheet 204. Here, second shape defines a regular, right, non-truncated pyramid polyhedron having four equilateral triangle faces embodied in four second cell walls 610, and third perimeter defines a square polygonal base having four sides, where each side has third length 614. Therefore, in this alternative embodiment, four second cell walls 610 of second resonant cell 608 are coupled to face sheet 202 along third perimeter. Further, in this alternative embodiment, a space defined by second cell walls 610 of respective second resonant cells 608, back sheet 204, and face sheet 202 contains a second volume 618 therein, where second volume 618 is approximately equal to first volume 606.

Also, in this alternative embodiment, core layer 200 of acoustic liner 118 includes a plurality of third resonant cells 620. Third resonant cell 620 defines a third shape (e.g., a regular non-pyramidal polyhedron with four equilateral triangle faces) that is different from first shape and second shape. Third shape is further defined by two first points 604 and two second points 612 of two adjacent non-truncated pyramid 406-type first resonant cells 209. Further, in this alternative embodiment, third resonant cell 620 has a third volume 622 defined by two opposing first cell walls 408, two adjacent second cell walls 610, back sheet 204, and face sheet 202. Thus, in this alternative embodiment, a total volume of core layer 200 in acoustic liner 118 is approximately equal to a sum of first volumes 606, second volumes 618, and third volumes 622, of plurality of first resonant cells 209, plurality of second resonant cells 608, and plurality of third resonant cells 620, respectively.

Figure 7:
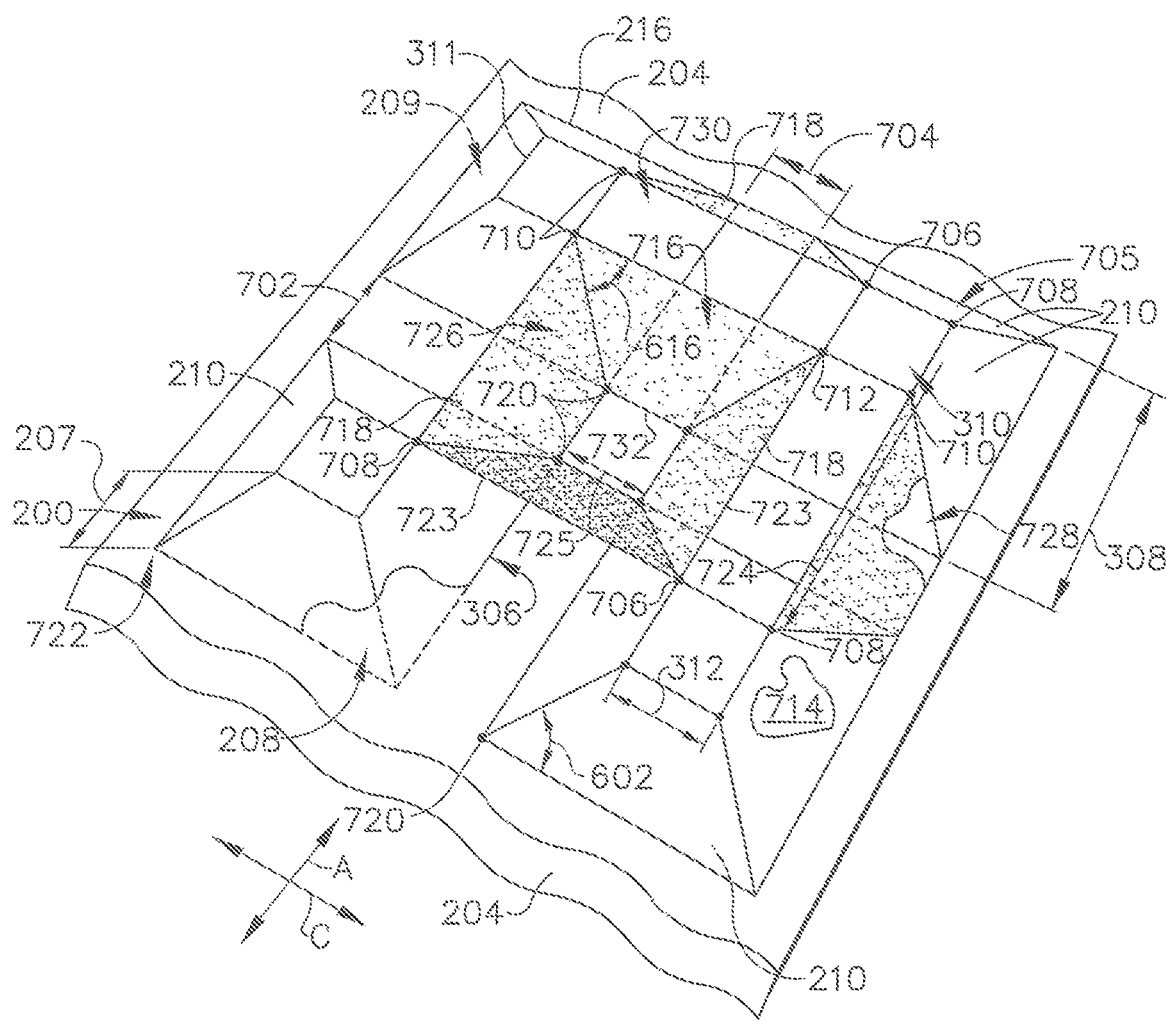
FIG. 7 is a perspective view of the cellular structure of still another alternative embodiment of the core layer shown in FIGS. 2 and 3 depicted in a non-annular version.

FIG. 7 is a perspective view of the cellular structure of still another alternative embodiment of core layer 200 of acoustic liner 118, but depicted in a non-annular version. For illustrative purposes face sheet 202 is removed from the view illustrated in FIG. 7. As illustrated in FIG. 7, plurality of first resonant cells 209 are positioned on back sheet 204 in a spaced arrangement, where, in the axial (A) direction, adjacent first resonant cells 209 are separated by a first gap distance 702 and where, in the circumferential (C) direction, adjacent first resonant cells 209 are separated by a second gap distance 704. In this alternative embodiment, first gap distance 702 is approximately equal to second gap distance 704. In other embodiments, not shown, second gap distance 704 is different from first gap distance 702.

In this alternative embodiment, each first resonant cell 209 of plurality of first resonant cells 209 coupled to back sheet 204 has an equivalent first shape embodied in truncated pyramid 302. First cell walls 210 extend from back sheet 204 to face sheet 202 at first angle 602. Four first cell walls 210 of truncated pyramid 302 are coupled to face sheet 202 along second perimeter of frustum 310. In this alternative embodiment, frustum 310 has four sides, each having second length 312 greater than 0, and where frustum 310 is further defined by four frustum points 705. Frustum points 705 include, in clockwise order as illustrated in FIG. 7, a first frustum point 706, a second frustum point 708, a third frustum point 710, and a fourth frustum point 712. A space defined by first cell walls 210 of respective truncated pyramid 302-type first resonant cells 209, back sheet 204, and face sheet 202 (e.g., at frustum 310) contains a first volume 714 therein.

In this alternative embodiment, core layer 200 of acoustic liner 118 includes a plurality of second resonant cells 716 having four second cell walls 718. Second cell wall 718 is formed as a trapezoidal planar sheet spanning two frustum points 705 of adjacent frustums 310 and two corner points 720 of adjacent corners 722 of first polygonal bases 306 of adjacent truncated pyramid 302-type first resonant cells 209. Second cell wall 718 is coupled to face sheet 202 along a second cell wall base edge 723 with a third length 724. A sum of third lengths 724 of respective second cell walls 718 defines a third perimeter along which second resonant cell 716 is coupled to face sheet 202.

Second cell wall 718 also extends from each of the two respective frustum points 705 on face sheet 202 at a second angle 616 to respective corner points 720 on back sheet 204. In this alternative embodiment, second angle 616 is approximately equal to first angle 602. In other embodiments, not shown, second angle 616 is different from first angle 602 where, for example, and without limitation, first resonant cell 209 is embodied in at least one of an irregular truncated pyramid and an oblique truncated pyramid. Also, in this alternative embodiment, second cell wall 718 is coupled to back sheet 204 along a second cell wall top edge 732 with a fourth length 725 less than third length 724 and greater than 0. Thus, in this alternative embodiment, second resonant cell 716 defines a polyhedral second shape having approximately equivalent dimensions as truncated pyramid 302-type first resonant cell 209 (e.g., four corner points 720 defining a square-shaped frustum and third length 724 approximately equal to first length 308, as shown and described above with reference to FIG. 3), but where second shape has an opposite orientation relative to first shape with respect to face sheet 202 and back sheet 204. Here, second shape defines a regular, right, truncated pyramid polyhedron having four trapezoidal faces embodied in four second cell walls 718, and third perimeter defines a square polygonal base having four sides, where each side has third length 724. Therefore, in this alternative embodiment, four second cell walls 718 of second resonant cell 716 are coupled to face sheet 202 along third perimeter. Further, in this alternative embodiment, a space defined by second cell walls 718 of respective second resonant cells 716, back sheet 204, and face sheet 202 contains a second volume 726 therein, where second volume 726 is approximately equal to first volume 714.

Also, in this alternative embodiment, core layer 200 of acoustic liner 118 includes a plurality of third resonant cells 728. Third resonant cell 728 defines a third shape (e.g., an irregular non-pyramidal polyhedron with four trapezoidal faces and two rectangular faces) that is different from first shape and second shape. Third shape is further defined by four frustum points 705 and four corner points 720 of two adjacent truncated pyramid 302-type first resonant cells 209. Further, in this alternative embodiment, third resonant cell 728 has a third volume 730 defined by two opposing first cell walls 210, two adjacent second cell walls 718, back sheet 204, and face sheet 202. Thus, in this alternative embodiment, a total volume of core layer 200 in acoustic liner 118 is approximately equal to a sum of first volumes 714, second volumes 726, and third volumes 730, of plurality of first resonant cells 209, plurality of second resonant cells 716, and plurality of third resonant cells 728, respectively.

In other embodiments, not shown, and where, for example, and without limitation, first gap distance 702 is different from second gap distance 704, each of first shape, second shape, and third shape have a different shape relative to one another. In such other embodiments, plurality of first resonant cells 209 all have the same shape with the same dimensions. However, where first gap distance 702 is less than second gap distance 704, second shape is embodied in an irregular, right, truncated pyramid and necessarily has a different shape than first shape. Similarly, as opposed to embodiments such as those shown and described above with reference to FIGS. 6 and 7, core layer 200 of acoustic liner 118 need not have regular spacing of plurality of first resonant cells 209 on back sheet 204, and by extension, need not have regular arrangements of spacing of plurality of first resonant cells 209, second resonant cells 716, and third resonant cells 728. For example, and without limitation, first gap distance 702 varied randomly in the axial (A) direction between a zero-valued distance (e.g., as in the embodiment shown in FIG. 6) to a non-zero-valued distance (e.g., as in the embodiment shown in FIG. 7) results in a random distribution of second volumes 726 and third volumes 730 in the axial (A) direction. Similarly, second gap distance 704 varied randomly in the circumferential (C) direction between zero-valued and non-zero-valued distances results in a random distribution of second volumes 726 and third volumes 730 in the circumferential (C) direction. Further, in still other embodiments, not shown, shapes and/or dimensions of first resonant cells 209 are varied randomly in at least one of the axial (A) direction and the circumferential (C) direction, resulting in random distributions of first volumes 714 in the respective directions, in addition to random distributions of second volumes 726 and third volumes 730.

Figure 8:
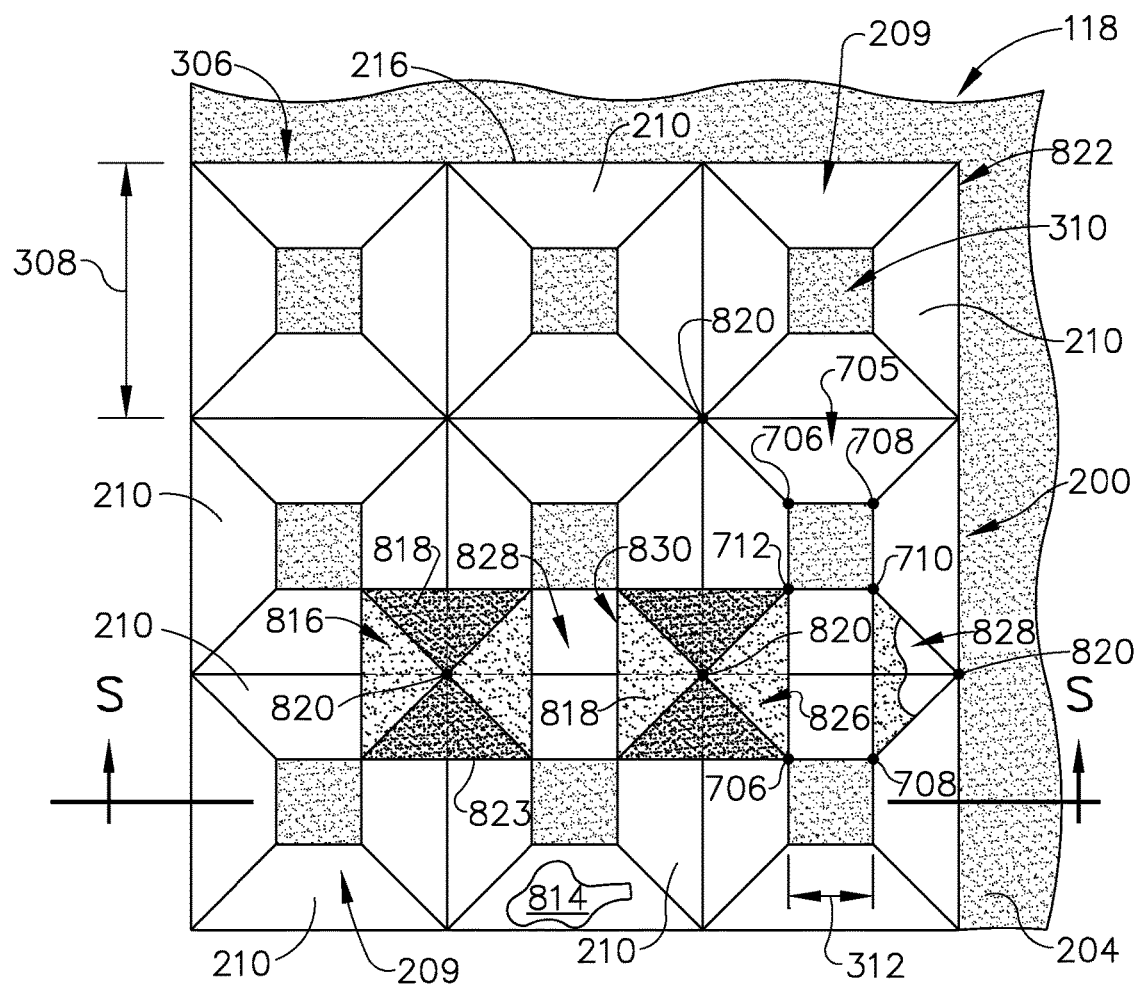
FIG. 8 is a pan view of the cellular structure of the core layer shown in FIGS. 2 and 3 depicted in a non-annular version.
Figure 9:
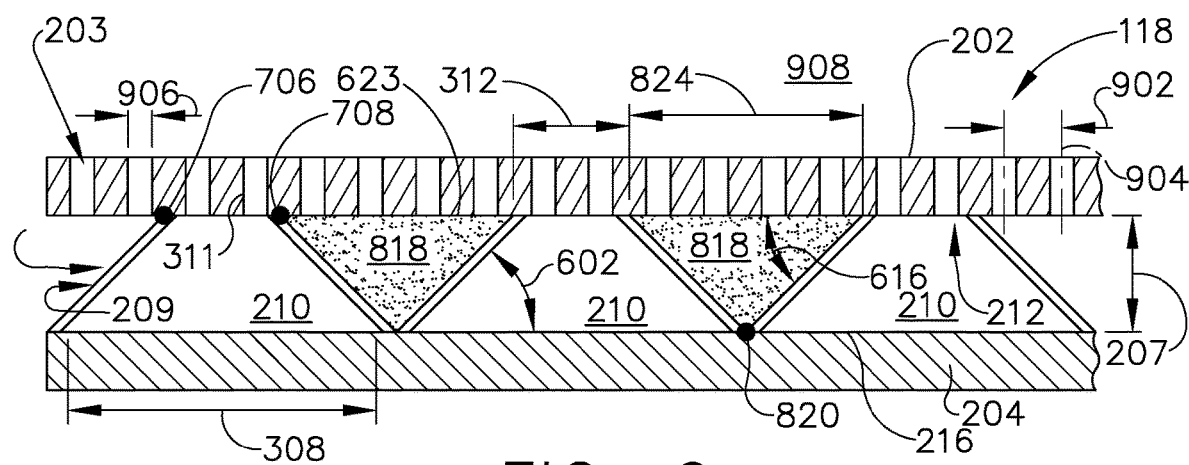
FIG. 9 is a sectional view of the core layer shown in FIG. 8.

FIG. 8 is a pan view of the cellular structure of the exemplary embodiment of acoustic liner 118 core layer 200 shown in FIG. 2, but depicted in a non-annular version. FIG. 9 is a sectional view of the acoustic liner 118 core layer 200 shown in FIG. 8 taken along a section line labeled "S-S". For illustrative purposes face sheet 202 is removed from the view illustrated in FIG. 8. Referring to FIG. 8, plurality of first resonant cells 209 are positioned on back sheet 204 in a grid arrangement, where, in contrast to the embodiment shown and described above with reference to FIG. 7, first gap distance 702 and second gap distance 704 are each approximately equal to 0.

In this alternative embodiment, each first resonant cell 209 of plurality of first resonant cells 209 coupled to back sheet 204 has an equivalent first shape embodied in truncated pyramid 302. Four first cell walls 210 of truncated pyramid 302 are coupled to face sheet 202 along second perimeter of frustum 310 with sides having second length 312 defined between frustum points 705, as shown and described above with reference to FIG. 3. A space defined by first cell walls 210 of respective truncated pyramid 302-type first resonant cells 209, back sheet 204, and face sheet 202 (e.g., at frustum 310) contains a first volume 814 therein.

In this alternative embodiment, core layer 200 of acoustic liner 118 includes a plurality of second resonant cells 816 having four second cell walls 818. Second cell wall 818 is formed as a triangular planar sheet spanning two frustum points 705 of adjacent frustums 310 and a shared corner point 820 of shared corners 822 of first polygonal bases 306 of adjacent truncated pyramid 302-type first resonant cells 209. Second cell wall 818 is coupled to face sheet 202 along a second cell wall base edge 823 with a third length 824. A sum of third lengths 824 of respective second cell walls 818 defines a third perimeter along which second resonant cell 816 is coupled to face sheet 202.

Also, in this alternative embodiment, second cell wall 818 is coupled to back sheet 204 at a respective corner point 820 having a fourth length approximately equal to 0. Thus, second resonant cell 816 defines a regular, right, non-truncated pyramid second shape having an apex defined by shared corner point 820 having approximately equivalent dimensions as truncated pyramid 302-type first resonant cell 209, but where second shape has an opposite orientation relative to first shape with respect to face sheet 202 and back sheet 204. Therefore, in this alternative embodiment, four second cell walls 818 of second resonant cell 816 are coupled to face sheet 202 along third perimeter. Further, in this alternative embodiment, a space defined by second cell walls 818 of respective second resonant cells 816, back sheet 204, and face sheet 202 contains a second volume 826 therein.

Also, in this alternative embodiment, core layer 200 of acoustic liner 118 includes a plurality of third resonant cells 828. Third resonant cell 828 defines a third shape (e.g., an irregular non-pyramidal polyhedron with two trapezoidal faces, two triangular faces, and one rectangular face) that is different from first shape and second shape. Third shape is further defined by four frustum points 705 and two corner points 820 of two adjacent truncated pyramid 302-type first resonant cells 209. Further, third resonant cell 828 has a third volume 830 defined by two opposing first cell walls 210, two adjacent second cell walls 818, back sheet 204, and face sheet 202. Thus, in this alternative embodiment, a total volume of core layer 200 in acoustic liner 118 is approximately equal to a sum of first volumes 814, second volumes 826, and third volumes 830, of plurality of first resonant cells 209, plurality of second resonant cells 816, and plurality of third resonant cells 828, respectively.

Referring now to FIG. 9, first cell walls 210 extend from back sheet 204 to face sheet 202 at first angle 602. Second cell wall 818 also extends from each of first frustum point 706 and second frustum point 708 on face sheet 202 at second angle 616 to respective shared corner points 820 on back sheet 204. In this alternative embodiment, second angle 616 is approximately equal to first angle 602. In other embodiments, not shown, second angle 616 is different from first angle 602 where, for example, and without limitation, first resonant cell 209 is embodied in at least one of an irregular truncated pyramid and an oblique truncated pyramid.

Also, in this alternative embodiment, thickness 207 is approximately equal to 1 (one) inch, first length 308 is approximately equal to ¾ (three-fourths) of 1 inch, and second length 312 is approximately equal to ⅜ (three-eights) of 1 inch. Further, in the alternative embodiment, a spacing distance 902 between perforation centerlines 904 of each perforation 203 of plurality of perforations 203 is approximately equal to second length 312, and a perforation diameter 906 is approximately equal to ¹⁄₂₀ (one twentieth) of 1 inch. In other embodiments, not shown, at least one of first length 308, second length 312, spacing distance 902, and perforation diameter 906 have values different from those values specified above. Furthermore, perforations 203 are positioned on face sheet 202 proximate frustum 310, second resonant cell 816, and third resonant cell 828 to facilitate fluid and gas exchange between first volume 814 and an exterior 908 of acoustic liner 118 to enable drying of core layer 200 following its deployment under wet and/or humid operating conditions.

Figure 10:
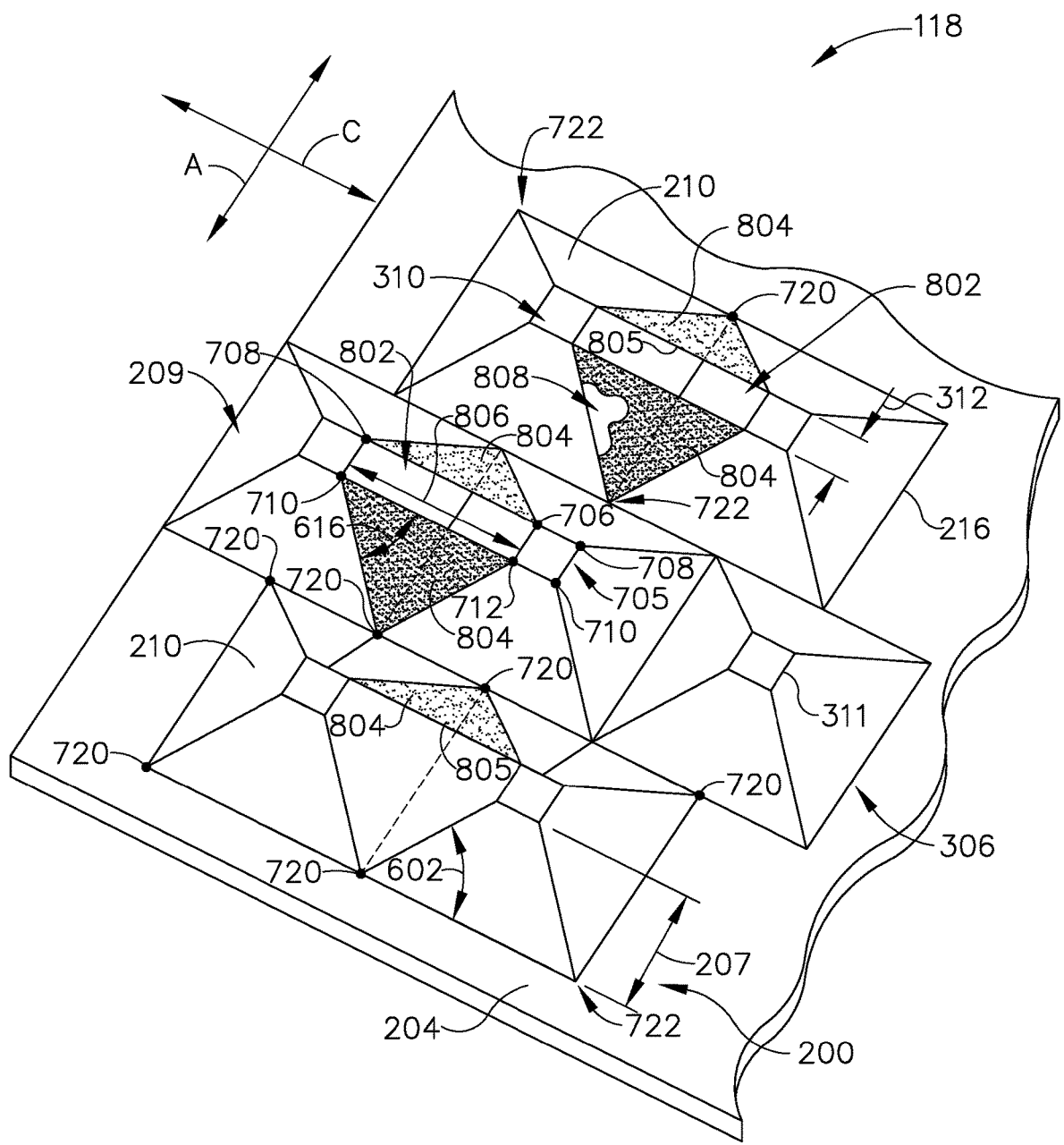
FIG. 10 is a perspective view of the cellular structure of yet another alternative embodiment of the core layer shown in FIGS. 2 and 3 depicted in a non-annular version.

FIG. 10 is a perspective view of the cellular structure of yet another alternative embodiment of core layer 200 of acoustic liner 118 shown in FIG. 2, but depicted in a non-annular version. For illustrative purposes face sheet 202 is removed from the view illustrated in FIG. 10. As illustrated in FIG. 10, plurality of first resonant cells 209 are positioned on back sheet 204 in an offset arrangement, where corner points 720 are not shared amongst plurality of adjacent first resonant cells 209. In this alternative embodiment, first gap distance 702 and second gap distance 704 (as shown and described above with reference to FIG. 7) are each approximately equal to 0. In other embodiments, not shown, at least one of first gap distance 702 and second gap distance 704 is greater than 0, which results in an increase in a number of corner points 720.

In this alternative embodiment, core layer 200 of acoustic liner 118 includes a plurality of second resonant cells 802 having two second cell walls 804. Second cell wall 804 is formed as a triangular planar sheet spanning two frustum points 705 of adjacent frustums 310 and one shared corner point 720 of first polygonal bases 306 of adjacent truncated pyramid 302-type first resonant cells 209. Second cell wall 804 is coupled to face sheet 202 along a second cell wall base edge 805 with a third length 806. A sum of third lengths 806 of respective second cell walls 804 plus a sum of two second lengths 312 of opposing first cell walls 210 (e.g., between first frustum point 706 and fourth frustum point 712, and between second frustum point 708 and third frustum point 710) defines a third perimeter along which second resonant cell 802 is coupled to face sheet 202.

Second cell wall 804 also extends from respective frustum points 705 on face sheet 202 at a second angle 616 to respective corner points 720 on back sheet 204. In this alternative embodiment, second angle 616 is approximately equal to first angle 602. In other embodiments, not shown, second angle 616 is different from first angle 602 where, for example, and without limitation, first resonant cell 209 is embodied in at least one of an irregular truncated pyramid and an oblique truncated pyramid. Also, in this alternative embodiment, second cell wall 804 is coupled to back sheet 204 along at a respective corner point 720 (e.g., having a fourth length approximately equal to 0). Thus, in this alternative embodiment, second resonant cell 802 defines an irregular polyhedral second shape having a different shape than first shape. Further, in this alternative embodiment, a space defined by second cell walls 804 of respective second resonant cells 802, back sheet 204, and face sheet 202 contains a second volume 808 therein. In other embodiments, not shown, core layer 200 illustrated in FIG. 10 further includes a plurality of third resonant cells. In such other embodiments, third resonant cells include third cell walls formed as substantially planar sheets spanning a predetermined combination of corner points 720 and frustum points 705. Further, plurality of third cell walls are capable of being formed between a plurality of combinations of corner points 720 and frustum points 705, and therefore, plurality of third resonant cells are capable of being formed in a plurality of different third shapes.

Figure 11:
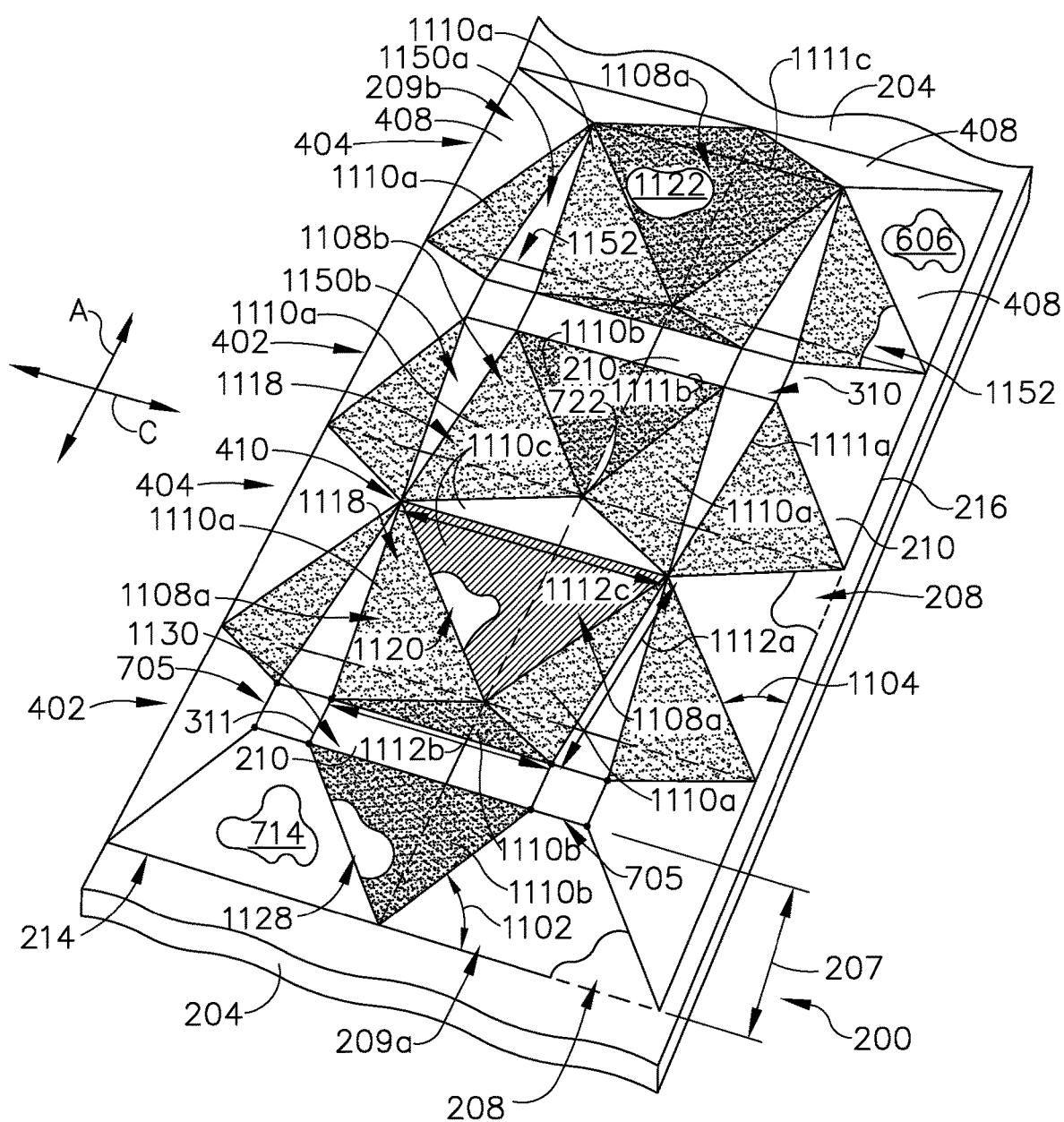
FIG. 11 is a perspective view of the cellular structure of the core layer shown in FIG. 4 depicted in a non-annular version.

FIG. 11 is a perspective view of the cellular structure of core layer 200 of acoustic liner 118 shown in FIG. 4, but depicted in a non-annular version. For illustrative purposes face sheet 202 is removed from the view illustrated in FIG. 11. As illustrated in FIGS. 4 and 11, plurality of first resonant cells 209 are positioned on back sheet 204 in a grid arrangement, where outer side 214 of core layer 200 forms a rectangular grid by a tessellation of regular rectangular openings 208 (shown in FIG. 2) that generally align in a plane where outer side 214 fixedly joins back sheet 204. Each first resonant cell 209 of plurality of first resonant cells 209 coupled to back sheet 204 does not have an equivalent first shape. Rather, as shown in FIGS. 4 and 11, respective first shapes of first resonant cells 209 alternative in an axial direction (A), with first rows 402 including first resonant cells 209a embodied in first shape defining regular, right, truncated pyramids 302 having frustums 310, and second rows 404 including first resonant cells 209b embodied in first shape defining regular, right, non-truncated pyramids 406 having apexes 410. First cell walls 210 of first resonant cells 209a extend from back sheet 204 to face sheet 202 at a first angle 1102, and first cell walls 408 of first resonant cells 209b extend from back sheet 204 to face sheet 202 at a first angle 1104. In this alternative embodiment, first angle 1102 is greater than first angle 1104 because frustum 310 and apex 410 both define thickness 207 from back sheet 204 to face sheet 202.

In this alternative embodiment, the second shape also alternates in the axial direction (A). Owing to the differing first shapes of first resonant cell 209a and first resonant cell 209b, a second resonant cell 1108a residing between first rows 402 and second rows 404 has a second shape embodied in an irregular, right pyramid. Second resonant cell 1108a includes four second cell walls 1110. Two second cell walls 1110a which oppose each other in the circumferential direction (C) are formed as planar triangular sheets spanning apex 410, one frustum point 705, and one shared corner point 720. Second cell wall 1110a is coupled to face sheet 202 along a second cell wall base edge 1111a with a third length 1112a. Second cell walls 1110a have approximately equal areas. Second cell wall 1110b and second cell wall 1110c oppose each other in the axial direction (A) and have differing areas. Second cell wall 1110b is formed as a planar triangular sheet spanning two frustum points 705 of adjacent frustums 310 and shared corner point 720. Second cell wall 1110c is formed as a planar triangular sheet spanning two adjacent apexes 410 and shared corner point 720. Second cell wall 1110b is coupled to face sheet 202 along a second cell wall base edge 1111b with a third length 1112b, and second cell wall 1110c is coupled to face sheet 202 along a second cell wall base edge 1111c with a third length 1112c greater than third length 1112b.

Also, in this alternative embodiment, a space defined by second cell walls 1110 of respective second resonant cells 1108a, back sheet 204, and face sheet 202 contains a second volume 1118 therein. Also owing to the differing first shapes of first resonant cell 209a and first resonant cell 209b, a second resonant cell 1108b residing between second rows 404 and first rows 402 also has second shape embodied in an irregular, right pyramid, but with an orientation opposite to second shape of second resonant cell 1108a with respect to the axial direction (A). Second resonant cell 1108b also defines a space containing second volume 1118 therein, as described above with reference to second resonant cell 1108a.

Further, in this alternative embodiment, the third shape also alternates in the axial direction (A). Owing to the differing first shapes of first resonant cell 209a and first resonant cell 209b, a third resonant cell 1128 residing between adjacent first resonant cells 209a has a third shape embodied in an irregular non-pyramidal polyhedron with two trapezoidal faces, two triangular faces, and one rectangular face. Further, in this alternative embodiment, third resonant cell 1128 has a third volume 1130 defined by two opposing first cell walls 210 of adjacent first resonant cells 209a, two adjacent second cell walls 1110b, back sheet 204, and face sheet 202. Also owing to the differing first shapes of first resonant cell 209a and first resonant cell 209b, a third resonant cell 1120 residing between adjacent first resonant cells 209b has a third shape embodied in a regular non-pyramidal polyhedron with four equilateral triangle faces. Third resonant cell 1120 has a third volume 1122 defined by two opposing first cell walls 408 of adjacent first resonant cells 209b, two adjacent second cell walls 1110c, back sheet 204, and face sheet 202.

Further owing to the differing first shapes first resonant cell 209a and first resonant cell 209b, in this alternative embodiment, core layer 200 includes a plurality of fourth resonant cells 1150. A fourth resonant cell 1150a has a fourth shape embodied in an irregular non-pyramidal polyhedron having two triangular faces with approximately equal areas (two adjacent second cell walls 1110a), one additional triangular face defined by face sheet 202, one trapezoidal face (one first cell wall 210), and a fourth triangular face (one first cell wall 408). Fourth resonant cell 1150 also has a fourth volume 1152 contained by a space enclosed by back sheet 204, face sheet 202, one first cell wall 210, one first cell wall 408, and two adjacent second cell walls 1110a of second resonant cells 1108a adjoined in the circumferential direction (C). Also owing to the differing first shapes of first resonant cell 209a and first resonant cell 209b, a fourth resonant cell 1150b has fourth volume 1152. Fourth resonant cell 1150b also has fourth shape embodied in an irregular non-pyramidal polyhedron as described above for fourth resonant cell 1150a, but with an orientation opposite to fourth shape of fourth resonant cell 1150a with respect to the axial direction (A). Thus, in this alternative embodiment, fourth shapes of plurality of fourth resonant cells 1150 alternate in the axial direction (A).

In other embodiments, not shown, and where, for example, and without limitation, the orientations of axial direction (A) and circumferential direction (C) are reversed relative to the orientations illustrated in FIG. 11, at least one of second shape, third shape, and fourth shape alternate in the circumferential (C) direction. In such other embodiments, alternation of first shape in the circumferential direction (e.g., as shown and described above with reference to FIG. 5) enables alternation of at least one of first, second, third, and fourth shapes in the circumferential direction (C).

Figure 12:
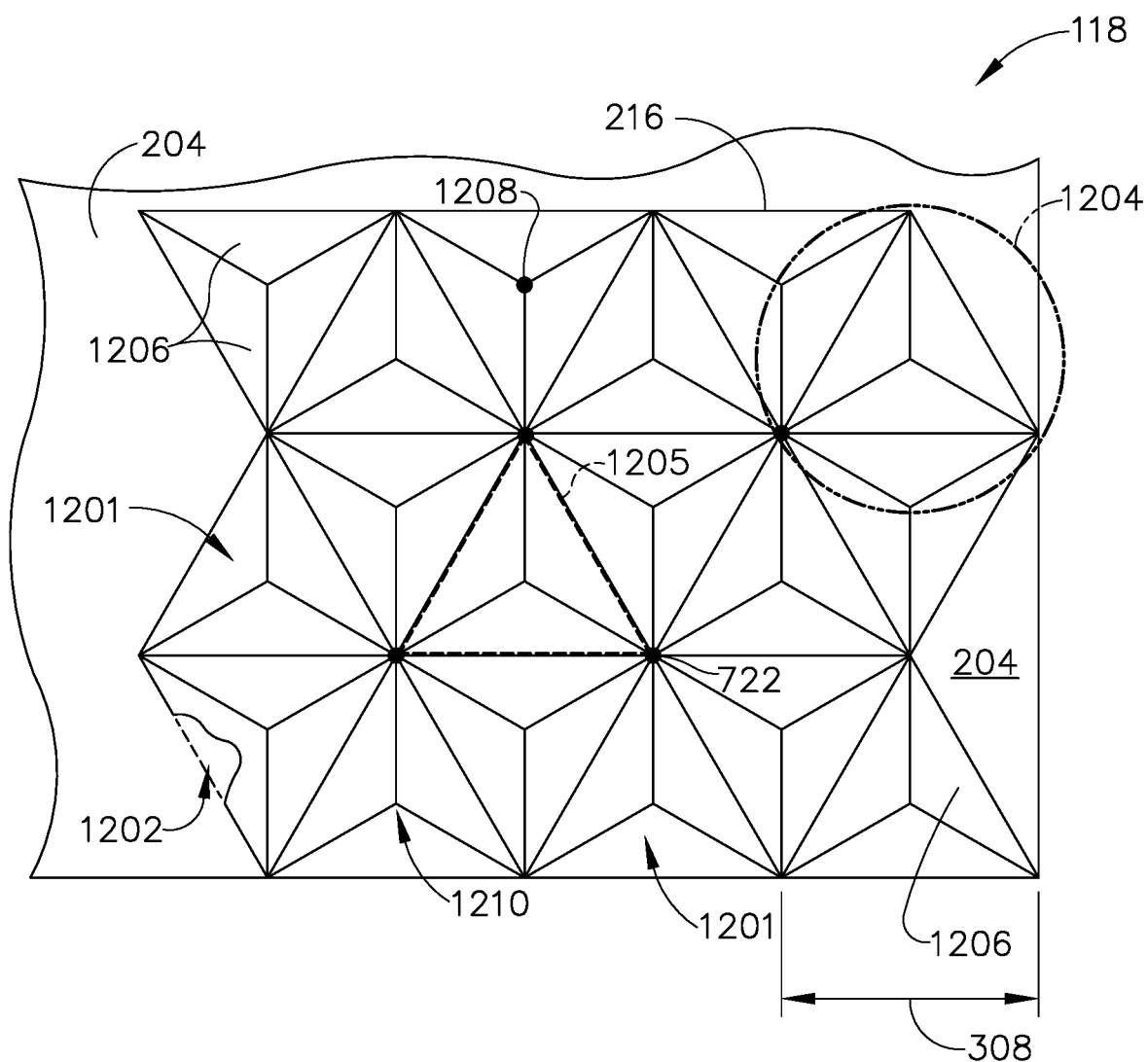
FIG. 12 is a pan view of the cellular structure of another alternative embodiment of the core layer shown in FIGS. 2 and 3 depicted in a non-annular version.
Figure 13:
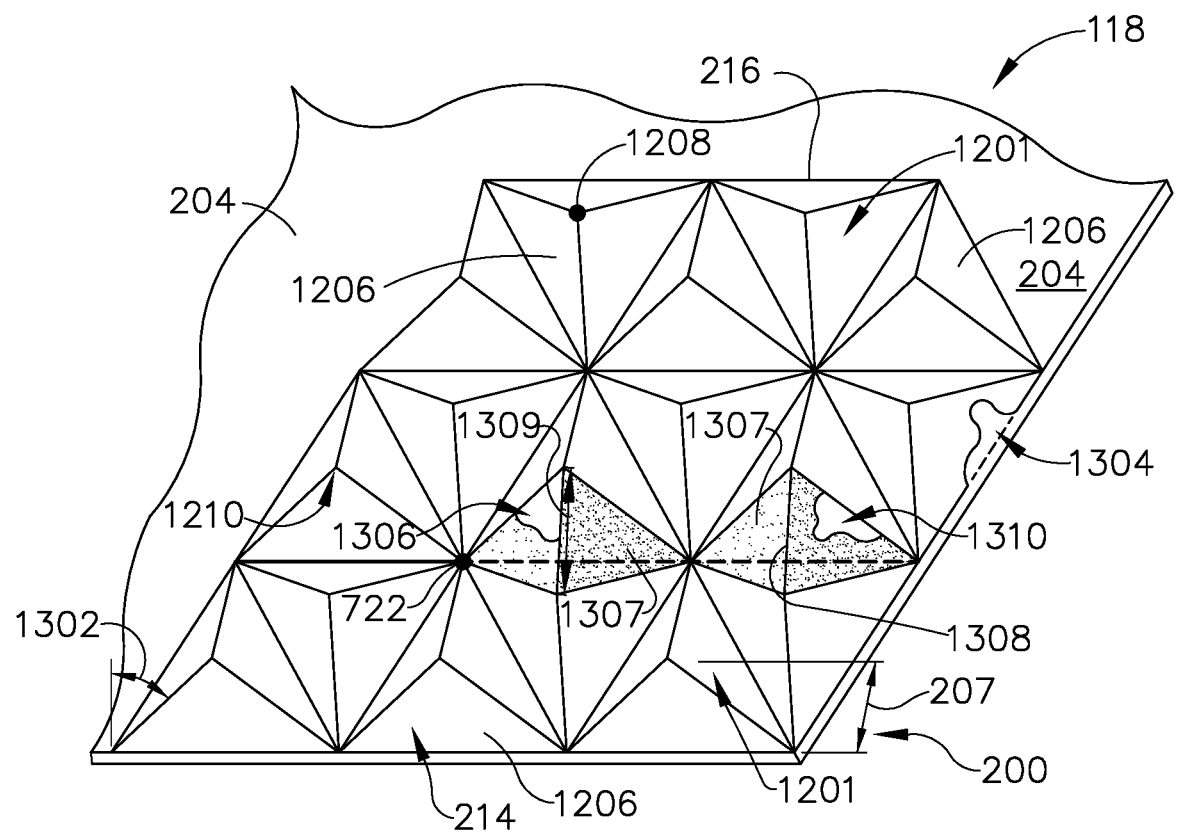
FIG. 13 is a perspective view of the core layer shown in FIG. 12.

FIG. 12 is a plan view of the cellular structure of another alternative embodiment of core layer 200 of acoustic liner 118 shown in FIG. 2, but depicted in a non-annular version. FIG. 13 is a perspective view of the acoustic liner 118 core layer 200 shown in FIG. 12. For illustrative purposes face sheet 202 is removed from the views illustrated in FIGS. 12 and 13. Referring to FIG. 12, a plurality of first resonant cells 1201 are positioned on back sheet 204 such that outer side 214 of core layer 200 forms a triangular grid by a tessellation of regular triangular openings 1202 that generally align in a plane where outer side 214 fixedly joins back sheet 204. Each first resonant cell 1201 of plurality of first resonant cells 1201 coupled to back sheet 204 has a first shape embodied in a non-truncated pyramid 1204, with a triangular first polygonal base 1205 having three sides (e.g., n=3), each having first lengths 308 that sum to first perimeter. In other embodiments, not shown, at least one first resonant cell 1201 of plurality of first resonant cells 1201 has a first shape embodied in a truncated pyramid having a triangular frustum with three sides each having second length 312 (shown in FIG. 3) and that sum to second perimeter. First resonant cell 1201 includes three first cell walls 1206, each of which extends from back sheet 204 to face sheet 202 at a first angle 1302. First cell walls 1206 of non-truncated pyramid 1204 couple to face sheet 202 at a first point 1208 defined by an apex 1210 and having second length 312 approximately equal to 0. A space defined by first cell walls 1206 of respective non-truncated pyramid 1204-type first resonant cells 1201, back sheet 204, and face sheet 202 contains a first volume 1304 therein.

Referring now to FIG. 13, in this alternative embodiment, core layer 200 includes a plurality of second resonant cells 1306 having two second cell walls 1307. Second cell wall 1307 is formed as a triangular planar sheet spanning two apexes 1210 of adjacent first resonant cells 1201 and one shared corner point 720. Second cell wall 1307 is coupled to face sheet 202 along a second cell wall base edge 1308 with a third length 1309. In other embodiments, not shown, core layer 200 having plurality of first resonant cells 1201 further includes a plurality of third resonant cells having at least one of the same and different shapes than second resonant cells 1306.

Figure 14:
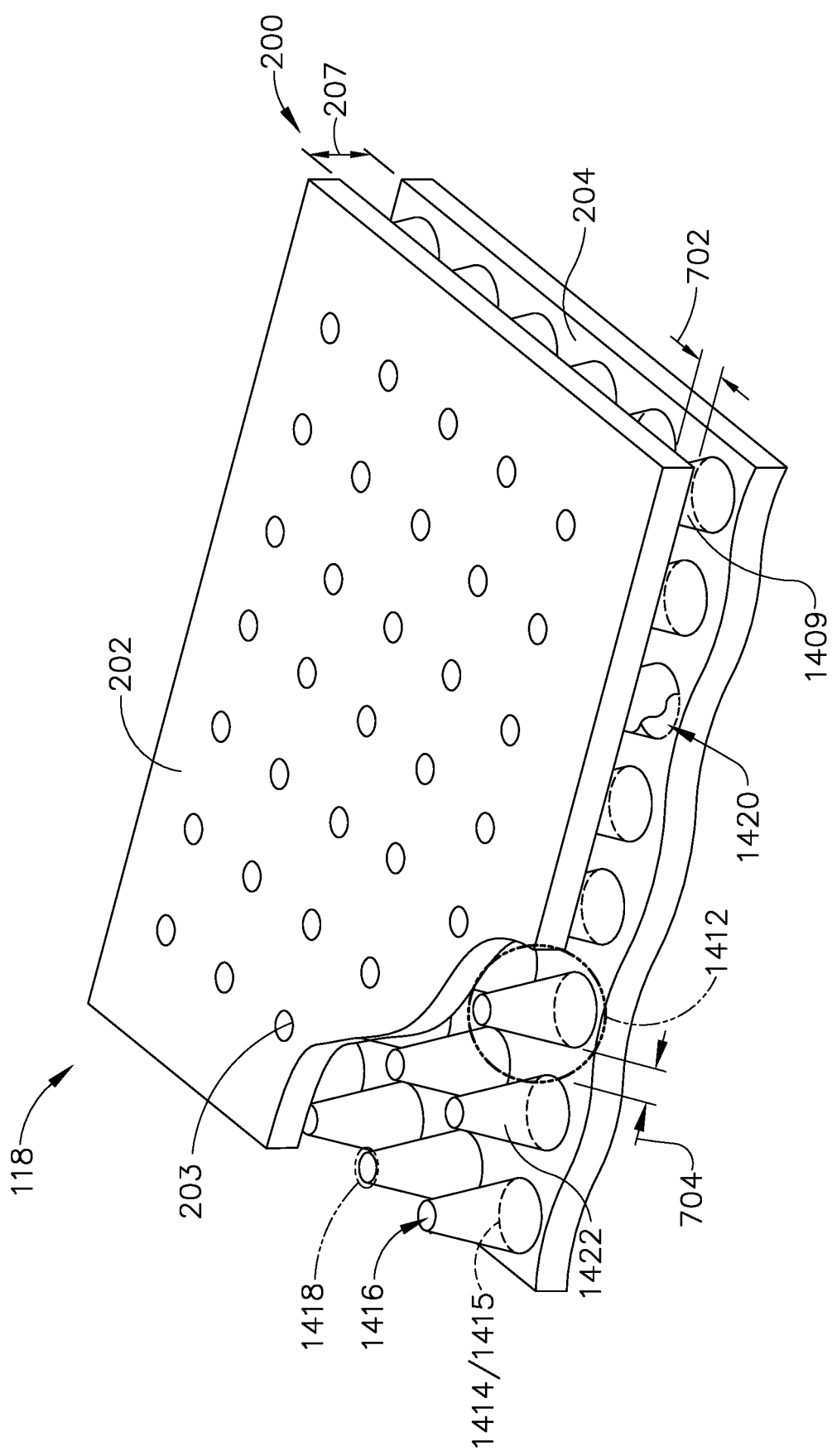
FIG. 14 is an isometric partial cutaway view of a portion of yet another alternative embodiment of the core layer shown in FIGS. 2 and 3 depicted in a non-annular version.

FIG. 14 is an isometric partial cutaway view of a portion of yet another alternative embodiment of core layer 200 of acoustic liner 118 shown in FIG. 2, but depicted in a non-annular version. In this alternative embodiment, a plurality of first resonant cells 1409 are positioned on back sheet 204 with first gap distance 702 and second gap distance 704 therebetween. Each first resonant cell 1409 of plurality of first resonant cells 1409 coupled to back sheet 204 has an equivalent first shape. Also, in this alternative embodiment, first resonant cell 1409 is embodied in a first shape defining a right, truncated cone 1412. Truncated cone 1412 includes an annular base 1414 embodied in a circle having a radius and a first circumference 1415 defining first length 308 (e.g., a truncated pyramid with a base having an infinite number of sides). First resonant cell 1409 is coupled to back sheet 204 along first circumference.

Also, in this alternative embodiment, first resonant cell 1409 includes a substantially planar circular frustum 1416 having a second circumference 1418 defining second length 312 (shown in FIG. 3) along which first resonant cell 1409 is coupled to face sheet 202 at frustum 1416. Second circumference 1418 is less than first circumference 1415. A distance between annular base 1414 and frustum 1416 is approximately equal to thickness 207 of core layer 200. Furthermore, first shape of truncated cone 1412-type first resonant cell 1409 contains a first volume 1420 therein defined by one arcuate first cell wall 1422 thereof, back sheet 204, and face sheet 202. In other embodiments, not shown, first shape of first resonant cell 1409 defines at least one of a right non-truncated circular cone, an oblique non-truncated circular cone, a right truncated elliptical (e.g., oblong) cone, a right non-truncated elliptical cone, an oblique elliptical truncated cone, and an oblique non-truncated cone.

Figure 15:
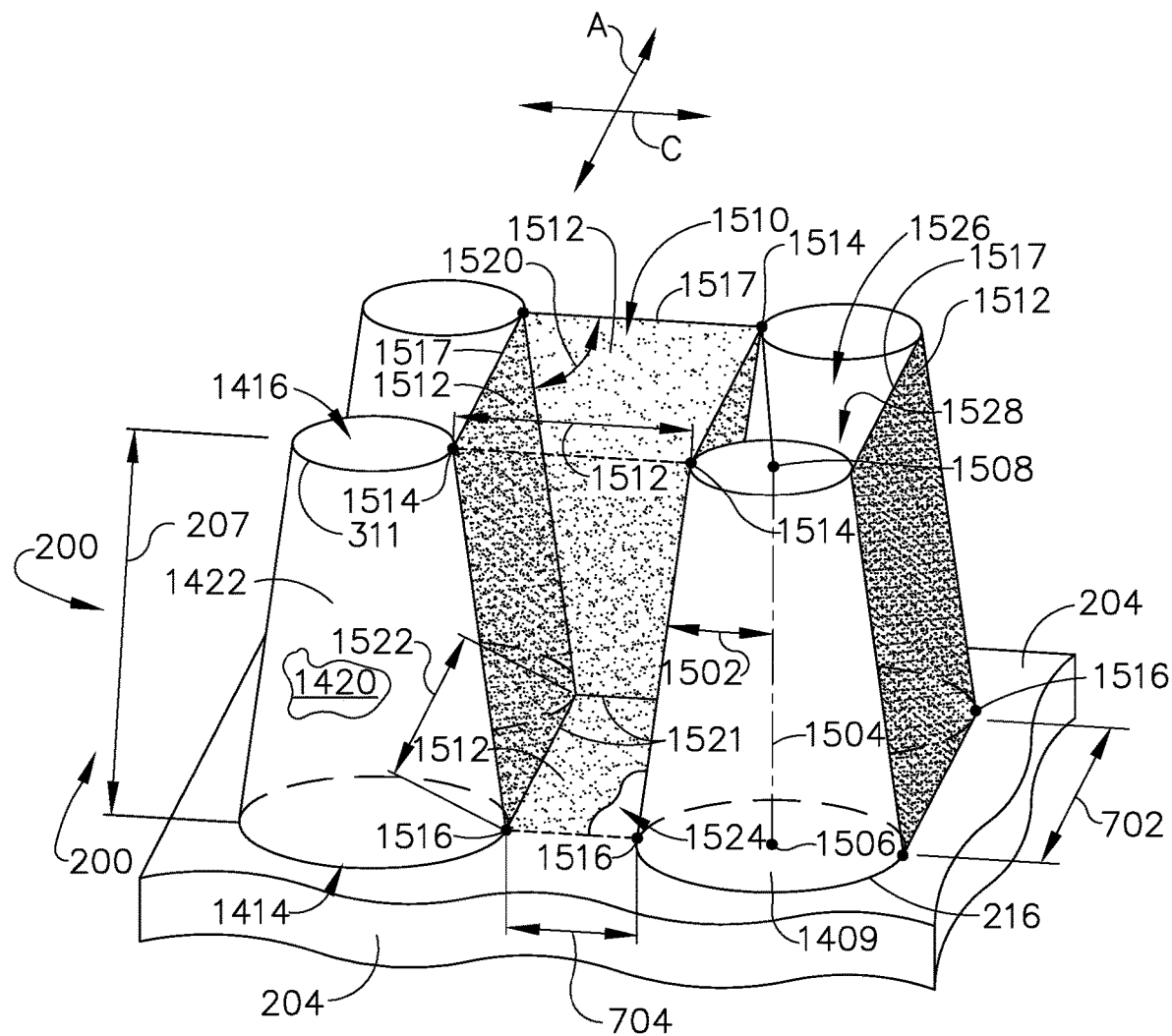
FIG. 15 is a perspective view of the cellular structure of the core layer shown in FIG. 14.

FIG. 15 is a perspective view of the cellular structure of core layer 200 shown in FIG. 14. For illustrative purposes face sheet 202 is removed from the view illustrated in FIG. 14. As illustrated in FIG. 14, plurality of first resonant cells 1409 are positioned on back sheet 204 in a spaced arrangement, where, in the axial (A) direction, adjacent first resonant cells 1409 are separated by first gap distance 702 and where, in the circumferential (C) direction, adjacent first resonant cells 1409 are separated by second gap distance 704. In this alternative embodiment, first gap distance 702 is approximately equal to second gap distance 704. In other embodiments, not shown, second gap distance 704 is different from first gap distance 702.

In this alternative embodiment, first cell wall 1422 extends from back sheet 204 to face sheet 202 at a first angle 1502 relative to a centerline 1504 of first resonant cell 1409 drawn between a base center 1506 and a frustum center 1508. A space defined by first cell wall 1422 of respective truncated cone 1412-type first resonant cells 1409, back sheet 204, and face sheet 202 (e.g., at frustum 1416) contains first volume 1420 therein. Also, in this alternative embodiment, core layer 200 of acoustic liner 118 includes a plurality of second resonant cells 1510 having four cell walls 1512. Second cell wall 1512 is formed as a trapezoidal planar sheet spanning frustum points 1514 of adjacent frustums 1416 and two base points 1516 of adjacent annular bases 1414. Second cell wall 1512 is coupled to face sheet 202 along a second cell wall base edge 1517 with third length 1518. A sum of third lengths 1518 of respective second cell walls 1512 defines a square having a third perimeter along which second resonant cell 1510 is coupled to face sheet 202.

Second cell wall 1512 also extends from each frustum point 1514 on face sheet 202 at a second angle 1520 to a respective base point 1516 on back sheet 204. In this alternative embodiment, second cell wall 1512 is coupled to back sheet 204 along a second cell wall top edge 1521 with a fourth length 1522 less than third length 1518 and greater than 0. Thus, in this alternative embodiment, second resonant cell 1510 defines a second shape embodied in a polyhedron having four trapezoidal faces embodied in four second cell walls 1512, and third perimeter defines a square polygonal base having four sides, where each side has third length 1518. Therefore, in this alternative embodiment, four second cell walls 1512 of second resonant cell 1510 are coupled to face sheet 202 along third perimeter. Further, in this alternative embodiment, a space defined by second cell walls 1512 of respective second resonant cells 1510, back sheet 204, and face sheet 202 contains a second volume 1524 therein.

Also, in this alternative embodiment, core layer 200 of acoustic liner 118 includes a plurality of third resonant cells 1526. Third resonant cell 1526 defines a third shape (e.g., a three-dimensional shape including two trapezoidal faces defined by two adjacent second cell walls 1512 of adjacent second resonant cells 1510, and two convex faces defined by portions of opposing first cell walls 1422 of adjacent first resonant cells 1409 facing into third resonant cell 1526). Third shape is further defined by four frustum points 1514 and four base points 1516 of two adjacent truncated cone 1412-type first resonant cells 1409. Further, in this alternative embodiment, third resonant cell 1526 has a third volume 1528 defined by portions of two adjacent first cell walls 1422, two adjacent second cell walls 1512, back sheet 204, and face sheet 202. Thus, in this alternative embodiment, a total volume of core layer 200 in acoustic liner 118 is approximately equal to a sum of first volumes 1420, second volumes 1524, and third volumes 1528, of plurality of first resonant cells 1409, plurality of second resonant cells 1510, and plurality of third resonant cells 1526, respectively.

In other embodiments, not shown, and where, for example, and without limitation, first gap distance 702 is different from second gap distance 704, each of first shape, second shape, and third shape have a different shape relative to one another. In such other embodiments, plurality of first resonant cells 1409 all have the same shape with the same dimensions. However, where first gap distance 702 is less than second gap distance 704, second shape is embodied in an irregular, right, truncated pyramid. Similarly, as opposed to embodiments such as those shown and described above with reference to FIGS. 14 and 15, core layer 200 of acoustic liner 118 need not have regular spacing of plurality of first resonant cells 1409 on back sheet 204, and by extension, need not have regular arrangements of spacing of plurality of first resonant cells 1409, second resonant cells 1510, and third resonant cells 1526. For example, and without limitation, first gap distance 702 varied randomly in the axial (A) direction between a zero-valued distance to a non-zero-valued distance results in a random distribution of second volumes 1524 and third volumes 1528 in the axial (A) direction. Similarly, second gap distance 704 varied randomly in the circumferential (C) direction between zero-valued and non-zero-valued distances results in a random distribution of second volumes 1524 and third volumes 1528 in the circumferential (C) direction. In still other embodiments, not shown, dimensions of first resonant cell 1409 are varied randomly in at least one of the axial (A) direction and the circumferential (C) direction, resulting in random distributions of first volumes 1420 in the respective directions, in addition to random distributions of second volumes 1524 and third volumes 1528. Further, in still other embodiments, not shown, shapes and/or dimensions of first resonant cells 1409 are varied randomly in at least one of the axial (A) direction and the circumferential (C) direction, resulting in random distributions of first volumes 1420 in the respective directions, in addition to random distributions of second volumes 1524 and third volumes 1528.

Figure 16:
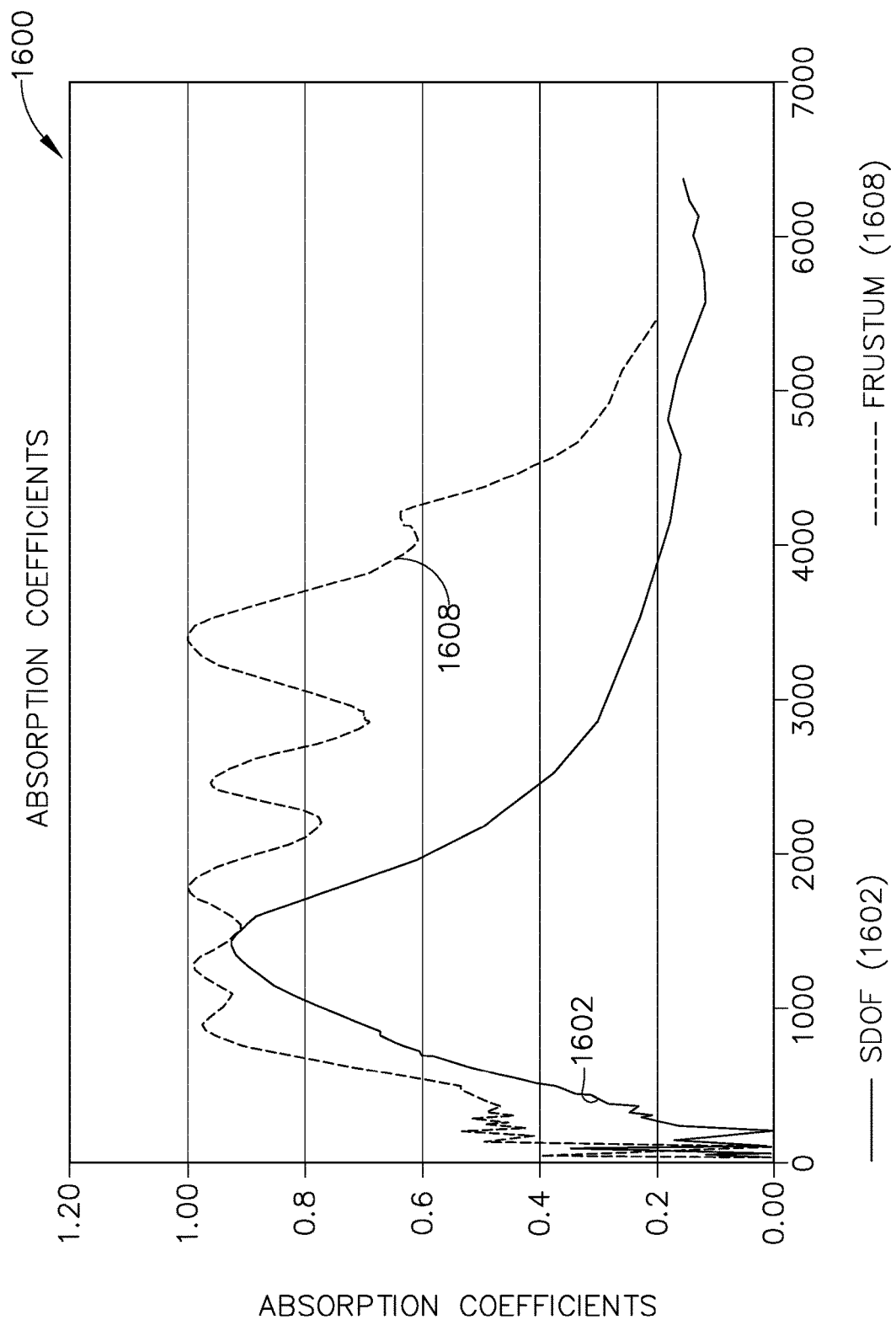
FIG. 16 is a graphical representation of operation of the core layer of the acoustic liner shown in FIGS. 7 and 8.

FIG. 16 is a graphical representation, i.e., graph 1600, of operation of core layer 200 of acoustic liner 118. As illustrated in FIG. 16, graph 1600 depicts six plots of sound absorption coefficient (a, y-axis) versus frequency in Hertz (Hz, x-axis) given a 130 decibel (dB) incident sound pressure level (SPL) upon face sheet 202. A first plot 1602, a second plot 1604, and a third plot 1606 represent sound absorption at three different locations on a known single degree of freedom (SDOF) acoustic liner core layers for up to about 6500 Hz. First plot 1602, second plot 1604, and third plot 1606 share approximately equal peak absorption coefficient values of about 0.90 at about 1500 Hz, with absorption coefficients maintained over about 0.80 in a band of frequencies from about 1100 Hz to about 1700 Hz. Also, first plot 1602, second plot 1604, and third plot 1606 maintain absorption coefficients over about 0.60 in a frequency band from about 700 Hz to about 2000 Hz. From 2000 Hz to 6500 Hz, absorption coefficient values of first plot 1602, second plot 1604, and third plot 1606 decay exponentially at about the same rates to about 0.15 at 6500 Hz.

Graph 1600 also includes a fourth plot 1608, a fifth plot 1610, and a sixth plot 1612 representing sound absorption at three different locations on continuous degree of freedom (CDOF) acoustic liner 118 having core layer 200 with truncated pyramid 302-type first resonant cells 209 substantially as shown and described with reference to FIGS. 2 and 3. Fourth plot 1608, fifth plot 1610, and sixth plot 1612 attain peak absorption coefficient values of about 1.00 at a plurality of frequencies ranging from about 800 Hz to about 3800 Hz. Also, fourth plot 1608, fifth plot 1610, and sixth plot 1612 maintain absorption coefficients over about 0.80 in two frequency bands from about 1000 Hz to about 2700 Hz, and from about 3300 Hz to about 3800 Hz. Furthermore, fourth plot 1608, fifth plot 1610, and sixth plot 1612 maintain absorption coefficients over about 0.60 in a frequency band from about 400 Hz to about 4400 Hz. From 4400 Hz to 6500 Hz, absorption coefficient values of fourth plot 1608, fifth plot 1610, and sixth plot 1612 decay exponentially at approximately the same rates to about 0.19 at 6500 Hz. Graph 1600 thus illustrates significantly wider frequency bands extending into lower frequencies and having absorption coefficient values greater than 0.60 and greater than 0.80 in CDOF-based acoustic liner 118 core layer 200 as compared to known SDOF acoustic liner core layer.

Figure 17:
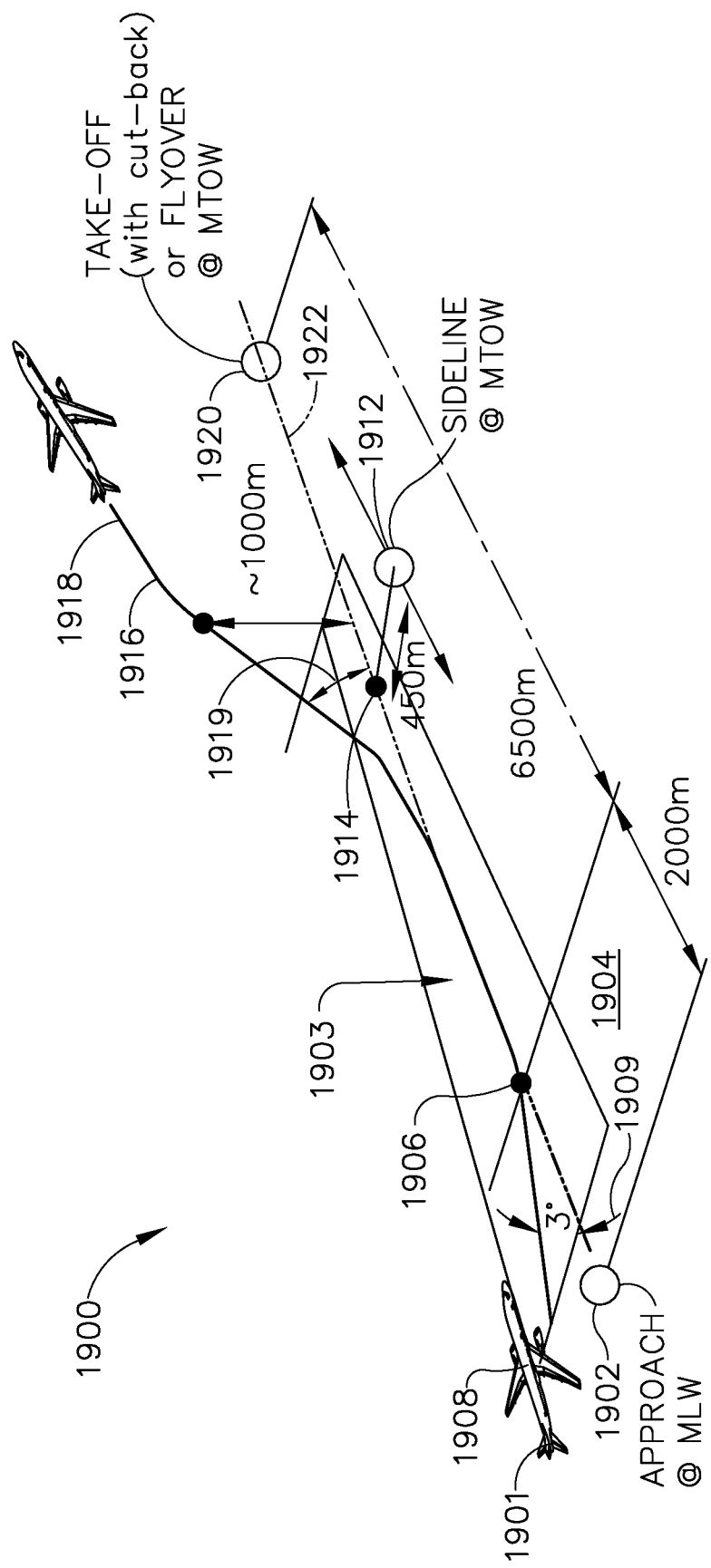
FIG. 17 is a schematic diagram of noise certification points where effective perceived noise level (EPNL) values are determined in a measurement scheme for the core layer of the acoustic liner shown in FIGS. 7 and 8.

FIG. 17 is a schematic diagram of noise certification points where effective perceived noise level (EPNL) values are determined in a measurement scheme 1900. In measurement scheme 1900, EPNL values are taken during operation of turbofan engine 100 having acoustic liner 118 with core layer 200 including truncated pyramid 302-type first resonant cells 209 substantially as shown and described above with reference to FIGS. 2 and 3. EPNL measurements are taken at three certification points. Measurement scheme 1900 includes a first certification point 1902 corresponding to an airborne approach (AP) at main lobe width (MLW) of aircraft 1901 to a runway 1903 on a ground surface 1904. First certification point 1902 is located on ground surface 1904 approximately directly underneath and perpendicular to airborne aircraft 1901, and about 2000 meters (m) from a touch-down point 1906 of aircraft 1901 on runway 1903. Also, at first certification point 1902, a center-wing point 1908 of aircraft 1901 and touch-down point 1906 define an angle 1910 approximately equal to 3 degrees relative to ground surface 1904.

Measurement scheme 1900 also includes a second certification point 1912 corresponding to a sideline (SL) at maximum take-off weight (MTOW) of aircraft 1901 after lifting-off from runway 1903. Second certification point 1912 is located on ground surface 1904 about 450 m laterally offset from a runway point 1914 that is approximately directly underneath and perpendicular to center-wing point 1908 by about 1000 m after aircraft 1901 has taken off from runway 1903. After taking-off from runway 1903, aircraft 1901 reaches an engine thrust reduction point 1916 on a flightpath 1918 where thrust of turbofan engine 100 is decreased and an ascent angle of flightpath 1918 is also decreased relative to ground surface 1904. Measurement scheme 1900 further includes a third certification point 1920 corresponding to a cutback (CB) at MTOW of aircraft 1901 after take-off. Third certification point 1920 is located on ground surface 1904 about 6500 m from touch-down point 1906 along a runway centerline 1922.

Figure 18:
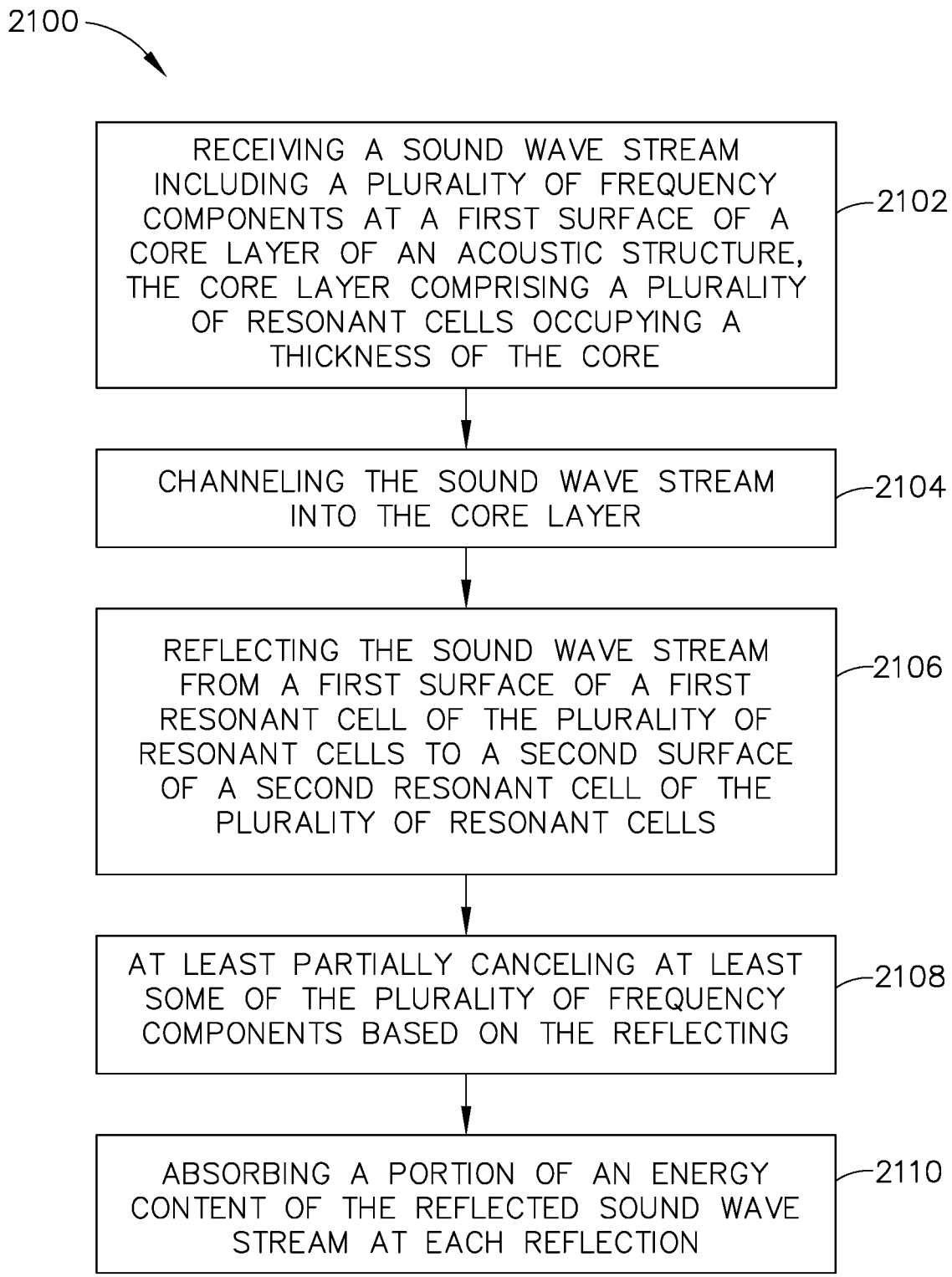
FIG. 18 is a flow chart of an exemplary method of attenuating noise from a source generating a sound wave stream that may be used with the core layer of the acoustic liner shown in FIGS. 7 and 8.

FIG. 18 is a flowchart of a method 2100 of attenuating noise from a source generating a sound wave stream. In the example embodiment, method 2100 includes receiving 2102 a sound wave stream including a plurality of frequency components at a first surface of a core layer of an acoustic structure, the core layer comprising a plurality of resonant cells occupying a thickness of the core layer. Method 2100 also includes channeling 2104 the sound wave stream into the core layer and reflecting 2106 the sound wave stream from a first surface of a first resonant cell of the plurality of resonant cells to a second surface of a second resonant cell of the plurality of resonant cells. Method 2100 also includes at least partially canceling 2108 at least some of the plurality of frequency components based on the reflecting and absorbing 2110 a portion of an energy content of the reflected sound wave stream at each reflection.

Figure 19:
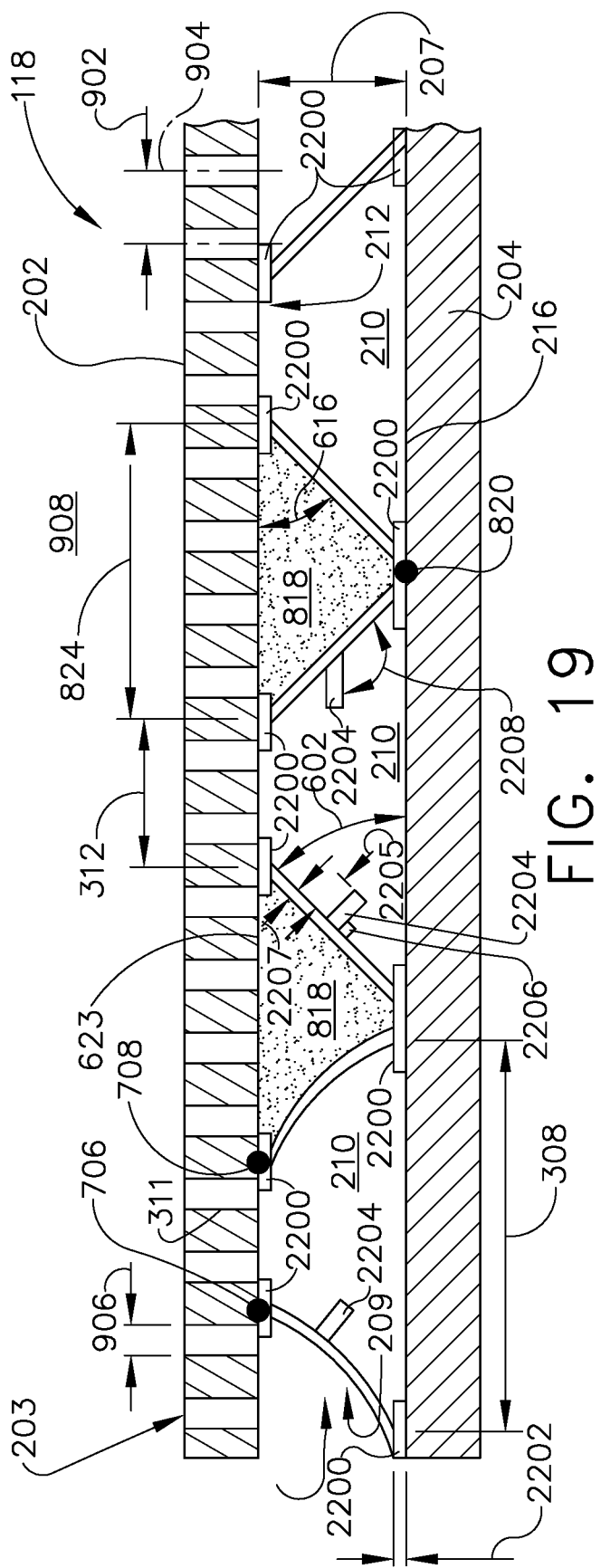
FIG. 19 is a side elevation view of another embodiment of the acoustic liner shown in FIG. 1 in accordance with an example embodiment of the present disclosure.

FIG. 19 is a side elevation view of another embodiment of acoustic liner 118 in accordance with an example embodiment of the present disclosure. In the example embodiment, additional bonding lands 2200 are formed at frustum points along face sheet 202, such as, but not limited to, first frustum point 706 and second frustum point 708. Bonding lands 2200 are also formed at corner points on back sheet 204, such as, but not limited to, corner point 820. Bonding lands 2200 provide additional bonding area for coupling cell wall 210 to face sheet 202 and/or back sheet 204. The additional bonding area includes a thickness 2202 that improves the strength in the bonding area.

In various embodiments, cell walls 210 are formed arcuately between adjacent cells 209. For example, cell walls 210 may be formed concavely or convexly with respect to any particular cell 209. In other embodiments, cell walls 210 include baffles or surface extensions 2204 that extend from a surface of cell walls 210 into cell 209. Surface extensions 2204 are relatively large structures rather than mere surface treatments. In various embodiments, surface extensions 2204 include a length 2205 that is greater than two times a thickness 2207 of cell walls 210. In other embodiments, surface extensions 2204 include a length that is five times a thickness of cell walls 210. In still other embodiments, surface extensions 2204 include a length that is ten times a thickness of cell walls 210. Surface extensions 2204 may extend from cell walls 210 at a right angle 2206 or at a non-orthogonal angle 2208. Surface extensions 2204 are sized and positioned along cell wall 210 to maximize a reflection of acoustic energy within cell 209 and improve resonance within cells 209. Although, as illustrated as having a single surface extension 2204 on each cell wall 210, any number of surface extensions may be spaced along cell wall 210. Moreover, a spacing between surface extensions 2204 on any cell wall 210 may be uniform or non-uniform.

Figure 20:
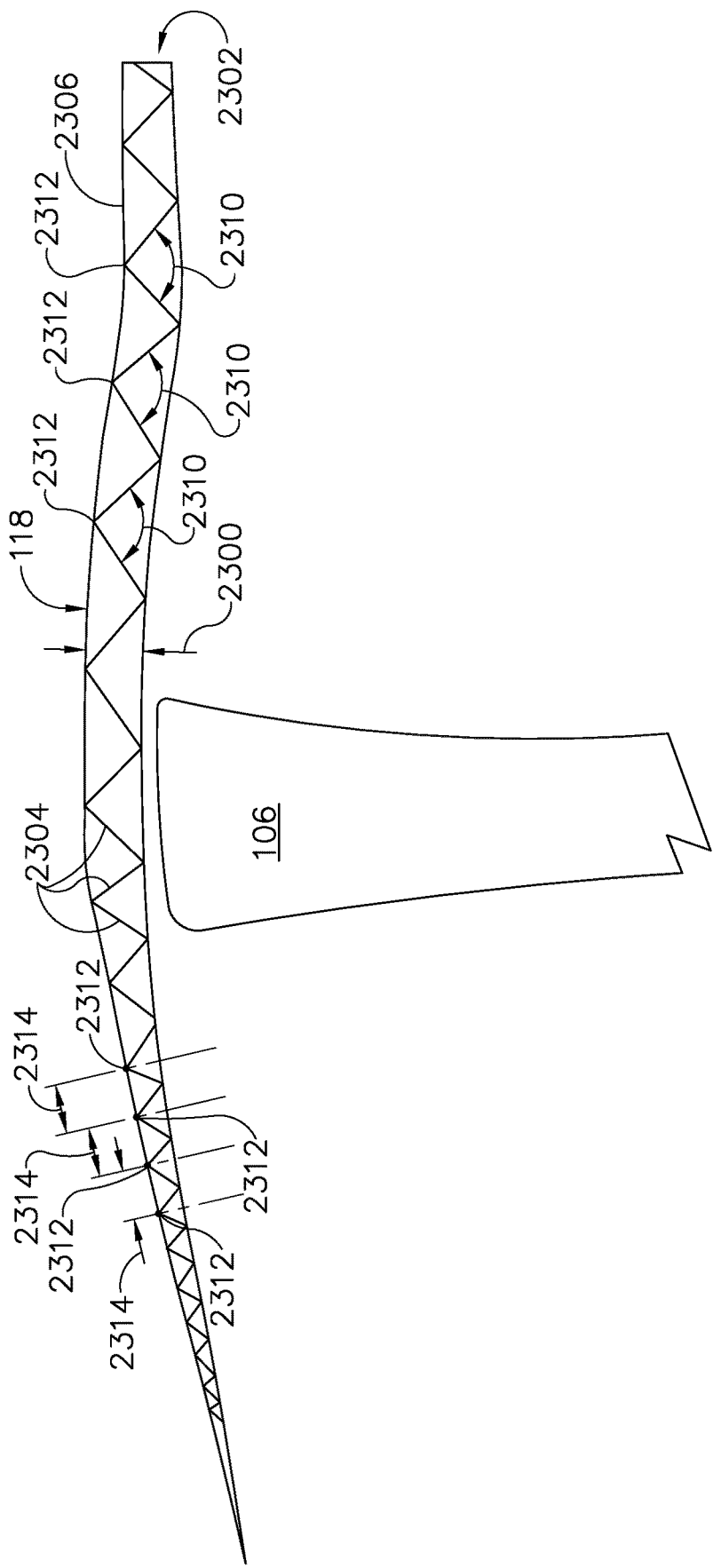
FIG. 20 is a side elevation view of the acoustic liner shown in FIG. 1 in accordance with another example embodiment of the present disclosure.

FIG. 20 is a side elevation view of acoustic liner 118 in accordance with another example embodiment of the present disclosure. In the example embodiment, acoustic liner 118 has an annular construction and is disposed along duct inner wall 112 (shown in FIG. 1). A thickness 2300 of acoustic liner 118 varies along a length of acoustic liner 118. In an exemplary embodiment, acoustic liner 118 is formed as a non-cylindrical acoustic liner 118 and is positioned along duct inner wall 112 extending from a position upstream 2301 of fan blades 106 to a position downstream of fan blades 106, and/or along non-rotating portions of nacelle 102 (shown in FIG. 1) or other components, ducts, or casings within turbofan engine 100 (shown in FIG. 1) where noise suppression (e.g., attenuation) is appropriate, or which are capable of intercepting and suppressing noise having a predetermined range of frequencies. In the example embodiment, a plurality of acoustic cells 2302 are formed by a plurality of cell walls 2304, which are similar to cell walls 210 (shown in FIG. 2). Cell walls 2304 extend between a face sheet 2306 and a back sheet 2308, which are similar to face sheet 202 and back sheet 204 (shown in FIG. 2). In various embodiments, cell walls 2304 form equal angles 2310 at each joint 2312 between adjacent cell walls 2304 and face sheet 2306. In other embodiments, acoustic cells 2302 are spaced evenly apart in that a distance 2314 between joints 2312 are approximately equal.

It is understood from the foregoing description and associated figures that the generally pyramidal shape of the first resonant cells on core layer is presented by way of example, and not in a limiting sense. Other sound wave absorptive properties and acoustic operational characteristics may be achieved using further variations on orientations of first resonant cells in acoustic liner core layers including, without limitation, positioning of second, third, and/or fourth resonant cells in core layers in relation to the first resonant cells. Such other embodiments utilized for core layers of acoustic liners and acoustic structures not having face sheets and back sheets still fall within the scope of the CDOF acoustic liners described herein for realizing acoustic suppression of greater numbers of frequencies relative to known SDOF and two degree of freedom (2DOF) core layers. Further, the above-described structures, systems and methods are not limited to the specific embodiments described herein, but rather, components of systems or steps of the methods may be utilized independently and separately from other components or steps described herein. For example, the acoustic structures having the above-described core layers may also be used in applications other than vehicle and other engines where CDOF-based acoustic structures are desirable for noise suppression (e.g., noise damping) in a number of environments, and in combination with any number of other sound wave absorption systems and methods.

Additionally, it should be understood that a foam material may be used within or surrounding the cells of acoustic liner 118. Such foam material may facilitate the acoustic performance of acoustic liner 118 and or the structural strength of acoustic liner 118.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An acoustic liner comprising:
    a face sheet;
    a back sheet spaced from said face sheet; and
    a core layer comprising:
        a plurality of adjacent cavities extending between said face sheet and said back sheet;
        a thickness defined by a distance between said face sheet and said back sheet, said core layer further comprising:
        a plurality of first resonant cells, each first resonant cell of said plurality of first resonant cells comprising:
            at least one first cell wall coupled to said back sheet along a first cell wall base edge, said at least one cell wall extending from said back sheet at a first angle toward said face sheet, said at least one first cell wall further coupled to said face sheet along a first cell wall top edge, said first resonant cell formed in a first shape, said first resonant cell containing a first volume in a space defined by said at least one first cell wall, said back sheet, and said face sheet, said first cell wall base edge comprising a first length, and said first cell wall top edge comprising a second length, said second length less than said first length.

2. The acoustic liner of claim 1, wherein said plurality of first resonant cells are positioned on said back sheet in a grid arrangement.

3. The acoustic liner of claim 1, wherein said plurality of first resonant cells are positioned on said back sheet in an offset arrangement.

4. The acoustic liner of claim 1, wherein the second length is approximately equal to zero.

5. The acoustic liner of claim 1, wherein said back sheet, said face sheet, and said core layer are formed as at least one of:
    a substantially flat acoustic liner;
    an arcuate cylindrical acoustic liner;
    a complexly curved acoustic liner.

6. The acoustic liner of claim 1, wherein said first length defines a first perimeter and said first shape defines a pyramid, said at least one first cell wall comprising at least three faces of said pyramid, said each first resonant cell further comprising a first polygonal base having at least three sides and said first perimeter, said at least one first cell wall further coupled to said back sheet along said first perimeter.

7. The acoustic liner of claim 6, wherein said first shape further defines at least one of a right pyramid, an oblique pyramid, a regular pyramid, and an irregular pyramid.

8. The acoustic liner of claim 6, wherein said first shape further defines a truncated pyramid comprising a frustum, and wherein said second length is defined by a second perimeter of said frustum, said at least one first cell wall further coupled to said face sheet along said second perimeter.

9. The acoustic liner of claim 1, wherein said first length defines a first circumference and said first shape defines a cone, said each first resonant cell further comprising an annular base having said first circumference, said at least one first cell wall coupled to said back sheet along said first circumference.

10. The acoustic liner of claim 9, wherein said first shape further defines at least one of a right circular cone, an oblique circular cone, a right elliptical cone, and an oblique elliptical cone.

11. The acoustic liner of claim 9, wherein said first shape further defines a truncated cone comprising an annular frustum, and wherein said second length is defined by a second circumference of said annular frustum, said at least one first cell wall coupled to said face sheet along said second circumference.

12. The acoustic liner of claim 1, said core layer further comprising a plurality of second resonant cells, each second resonant cell of said plurality of second resonant cells comprising:
at least two second cell walls, each second cell wall of said at least two second cell walls coupled to said face sheet along a second cell wall base edge, said each second cell wall extending from said face sheet at a second angle toward said back sheet, said each second cell wall further coupled to said back sheet along a second cell wall top edge, said each second resonant cell formed in a second shape, said each second resonant cell containing a second volume in a space defined by said at least two second cell walls, said back sheet, said face sheet, and at least two adjacent first resonant cells of said plurality of first resonant cells, said second cell wall base edge comprises a third length, and said second cell wall top edge comprising a fourth length, said fourth length is less than said third length.

13. The acoustic liner of claim 12, wherein said third length defines a third perimeter and said second shape defines a polyhedron, said at least two second cell walls comprising at least three faces of said polyhedron, said each second resonant cell further comprising a second polygonal base having at least three sides and said third perimeter, said at least one second cell wall further coupled to said face sheet along said third perimeter.

14. The acoustic liner of claim 12, wherein said second shape defines at least one of a regular polyhedron and an irregular polyhedron.

15. The acoustic liner of claim 12, said core layer further comprising a plurality of third resonant cells, each third resonant cell of said plurality of third resonant cells formed in a third shape, said each third resonant cell containing a third volume in a space defined by at least two second cell walls, said back sheet, said face sheet, and said at least two adjacent first resonant cells.

16. The acoustic liner of claim 15, wherein each of said first shape, said second shape, and said third shape have a different shape relative to one another.

17. The acoustic liner of claim 15, wherein said first shape and said third shape alternate in an axial direction, the axial direction substantially perpendicular to a circumferential direction.

18. The acoustic liner of claim 15, wherein said first shape and said third shape alternate in a circumferential direction, the circumferential direction substantially perpendicular to an axial direction.

19. The acoustic liner of claim 15, wherein said third shape defines at least one of a regular non-pyramidal polyhedron, an irregular non-pyramidal polyhedron, a right pyramid, an oblique pyramid, a regular pyramid, and an irregular pyramid.

20. An acoustic structure comprising:
a core layer comprising:
an inner side and an outer side spaced opposite said inner side across a thickness defined therebetween; and
a plurality of first resonant cells occupying the thickness of said core layer, each first resonant cell of said plurality of first resonant cells comprising:
at least one first cell wall extending at a first angle from a first cell wall base edge along the outer side to a first cell wall top edge along the inner side, said first resonant cell formed in a first shape, said first resonant cell containing a first volume in a space defined by said at least one cell wall, the inner side, and the outer side, said first cell wall base edge comprising a first length, and said first cell wall top edge comprising a second length, said second length less than said first length.

21. A method of attenuating noise from a source generating a sound wave stream, said method comprising:
receiving a sound wave stream including a plurality of frequency components at a first surface of a core layer of an acoustic structure, the core layer comprising a plurality of resonant cells occupying a thickness of the core layer;
channeling the sound wave stream into the core layer;
reflecting the sound wave stream from a first surface of a first resonant cell of the plurality of resonant cells to a second surface of a second resonant cell of the plurality of resonant cells;
at least partially canceling at least some of the plurality of frequency components based on the reflecting; and
absorbing a portion of an energy content of the reflected sound wave stream at each reflection.

22. An acoustic liner comprising:
a face sheet comprising a plurality of bonding lands;
a back sheet comprising a plurality of bonding lands and spaced from said face sheet; and
a core layer sandwiched between said face sheet and said back sheet, said core layer comprising a plurality of cell walls extending between a respective face sheet bonding land to a respective back sheet bonding land to form said plurality of adjacent resonant cells.

23. The acoustic liner of claim 22 wherein at least some of said plurality of cell walls extend arcuately between said face sheet and said back sheet to form the plurality of adjacent resonant cells.

24. The acoustic liner of claim 22 wherein at least some of said plurality of cell walls comprise at least one surface extension.

25. The acoustic liner of claim 24 wherein at least some of said plurality of cell walls comprise at least one surface extension extending from a surface of a respective cell wall of the at least some of said plurality of cell walls into an adjacent resonant cell.

26. The acoustic liner of claim 22, wherein at least two cell walls of the plurality of cell walls connect to each single bonding land forming an angle between the at least two cell walls and wherein a plurality of the formed angles are equal with respect to each other.

27. The acoustic liner of claim 22, wherein an apex of the formed angles are uniformly spaced with respect to each other.

28. The acoustic liner of claim 1, wherein at least one of said plurality of adjacent cavities and said plurality of first resonant cells are at least partially filled with a foam material.

* * * * *